US011296518B2

(12) United States Patent
Park et al.

(10) Patent No.: US 11,296,518 B2
(45) Date of Patent: Apr. 5, 2022

(54) POWER CIRCUIT AND ELECTRONIC DEVICE INCLUDING THE SAME

(71) Applicant: Samsung Electronics Co., Ltd., Gyeonggi-do (KR)

(72) Inventors: Seho Park, Gyeonggi-do (KR); Kisun Lee, Gyeonggi-do (KR); Kyusik Choi, Gyeonggi-do (KR)

(73) Assignee: Samsung Electronics Co., Ltd ( * ) Notice: Subject to any disclaimer, the term of this patent is extended or adjusted under 35 U.S.C. 154(b) by 80 days.

(21) Appl. No.: 16/834,539

(22) Filed: Mar. 30, 2020

(65) Prior Publication Data
US 2020/0313446 A1 Oct. 1, 2020

(30) Foreign Application Priority Data

Mar. 28, 2019 (KR) .................. 10-2019-0036191

(51) Int. Cl.
H02J 7/00 (2006.01)
H02J 7/02 (2016.01)
(Continued)

(52) U.S. Cl.
CPC ......... H02J 7/0024 (2013.01); H01M 10/425 (2013.01); H01M 10/441 (2013.01);
(Continued)

(58) Field of Classification Search
CPC ...... H02J 7/0024; H02J 7/0042; H02J 7/0071; H02J 7/0047; H02J 7/02; H02J 7/0029;
(Continued)

(56) References Cited

U.S. PATENT DOCUMENTS 9,190,855 B2   11/2015   White et al.
9,203,246 B2   12/2015   Kang et al.
(Continued)

FOREIGN PATENT DOCUMENTS

KR   10-0969589      7/2010
KR   1020140135419   11/2014
KR   10-2015-0000675  1/2015

OTHER PUBLICATIONS

International Search Report dated Jul. 23, 2020 issued in counterpart application No. PCT/KR2020/004372, 10 pages.

Primary Examiner — Sun J Lin
(74) Attorney, Agent, or Firm — The Farrell Law Firm, P.C.

(57) ABSTRACT

An electronic device includes a housing, a display exposed through one surface of the housing, at least one ground member, a first battery disposed in the housing and including a first anode and a first cathode, a second battery disposed in the housing and including a second anode and a second cathode electrically connected with the at least one ground member, a charging circuit electrically connected with the first battery and the second battery, a charging interface electrically connected with the charging circuit, and a power management integrated circuit electrically connected with the charging interface and the charging circuit and managing power supplied to the electronic device. When an external power source is connected through the charging interface, the charging circuit connects the first battery and the second battery in series during a first time period and connects the first battery and the second battery in parallel during a second time period.

17 Claims, 15 Drawing Sheets

(51) Int. Cl.
*H01M 10/42* (2006.01)
*H01M 10/46* (2006.01)
*H01M 10/44* (2006.01)

(52) U.S. Cl.
CPC .......... *H01M 10/46* (2013.01); *H02J 7/0029* (2013.01); *H02J 7/0042* (2013.01); *H02J 7/0047* (2013.01); *H02J 7/0071* (2020.01); *H02J 7/02* (2013.01); *H01M 2010/4271* (2013.01); *H01M 2220/30* (2013.01); *H02J 2207/20* (2020.01)

(58) Field of Classification Search
CPC .......... H02J 2207/20; H01M 2220/30; H01M 10/425; H01M 10/46; H01M 10/441; H01M 2010/4271
USPC ........................................................ 320/107
See application file for complete search history.

(56) References Cited

U.S. PATENT DOCUMENTS

| | | |
|---|---|---|
| 9,525,301 B2 | 12/2016 | White et al. |
| 9,537,331 B2 * | 1/2017 | Kim et al. ............ H02J 7/0016 |
| 10,211,652 B2 * | 2/2019 | Kwon et al. ............ H02J 7/342 |
| 10,389,147 B2 | 8/2019 | Jung et al. |
| 2012/0293128 A1 | 11/2012 | Kim et al. |
| 2012/0319658 A1 | 12/2012 | White et al. |
| 2014/0340022 A1 | 11/2014 | Kang et al. |
| 2014/0375280 A1 | 12/2014 | Jung et al. |
| 2016/0064965 A1 | 3/2016 | White et al. |
| 2017/0005489 A1 | 1/2017 | Kwon et al. |

\* cited by examiner though the charging interface, the charging circuit connects the first cathode and the second anode, during a first time period, such that the first battery and the second battery are connected in series, connects the first battery and the second battery in parallel during a second time period, and connects the first anode and the second cathode, during a third time period, such that the second battery and the first battery are connected in series.

POWER CIRCUIT AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2019-0036191, filed on Mar. 28, 2019, in the Korean Intellectual Property Office, the disclosure of which is incorporated by reference herein in its entirety.

BACKGROUND

1. Field

The disclosure relates generally to a charging circuit of an electronic device.

2. Description of Related Art

A portable electronic device may include a battery and may be driven by using power supplied from the battery. In the case where the portable electronic device including the battery uses a given amount of power or more, the portable electronic device may require charging. The battery of the portable electronic device may charge the given amount of power by using a charger.

Thus, it would be advantageous to decrease the time it takes to charge the battery with the given amount of power. Also, because it is necessary to supply power to drive a portable electronic device while charging the battery, it also may be necessary to control both the charging of the battery and the supply of the power to the portable electronic device.

SUMMARY

The present disclosure has been made to address the above-mentioned problems and disadvantages, and to provide at least the advantages described below. In accordance with an aspect of the disclosure, an electronic device includes a housing, a display exposed through at least one surface of the housing, at least one ground member, a first battery disposed in the housing and including a first anode and a first cathode, a second battery disposed in the housing and including a second anode and a second cathode, which is electrically connected with the ground member, a charging circuit electrically connected with the first battery and the second battery, a charging interface electrically connected with the charging circuit, and a power management integrated circuit (PMIC) electrically connected with the charging interface and the charging circuit and managing power supplied to the electronic device. When an external power source is connected through the charging interface, the charging circuit connects the first battery and the second battery in series during a first time period and connects the first battery and the second battery in parallel during a second time period.

In accordance with another aspect of the disclosure, an electronic device includes a housing, a display exposed through one surface of the housing, at least one ground member, a first battery disposed in the housing and including a first anode and a first cathode, a second battery disposed in the housing and including a second anode and a second cathode, a charging circuit electrically connected with the first battery and the second battery, a charging interface electrically connected with the charging circuit, and a PMIC electrically connected with the charging interface and the charging circuit and managing power supplied to the electronic device. When an external power source is connected through the charging interface, the charging circuit connects the first cathode and the second anode, during a first time period, such that the first battery and the second battery are connected in series, connects the first battery and the second battery in parallel during a second time period, and connects the first anode and the second cathode, during a third time period, such that the second battery and the first battery are connected in series.

In accordance with another aspect of the disclosure, an electronic device includes a load, a first battery and a second battery operatively connected with the load, and a charging circuit controlling charging or discharging of the first battery and the second battery, and the charging circuit includes a first switched battery charger connected with the first battery, a second switched battery charger connected with the second battery, and a PMIC connected with the first switched battery charger and the second switched battery charger, and the PMIC controls the first switched battery charger and the second switched battery charger to connect the first battery and the second battery in series or in parallel.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
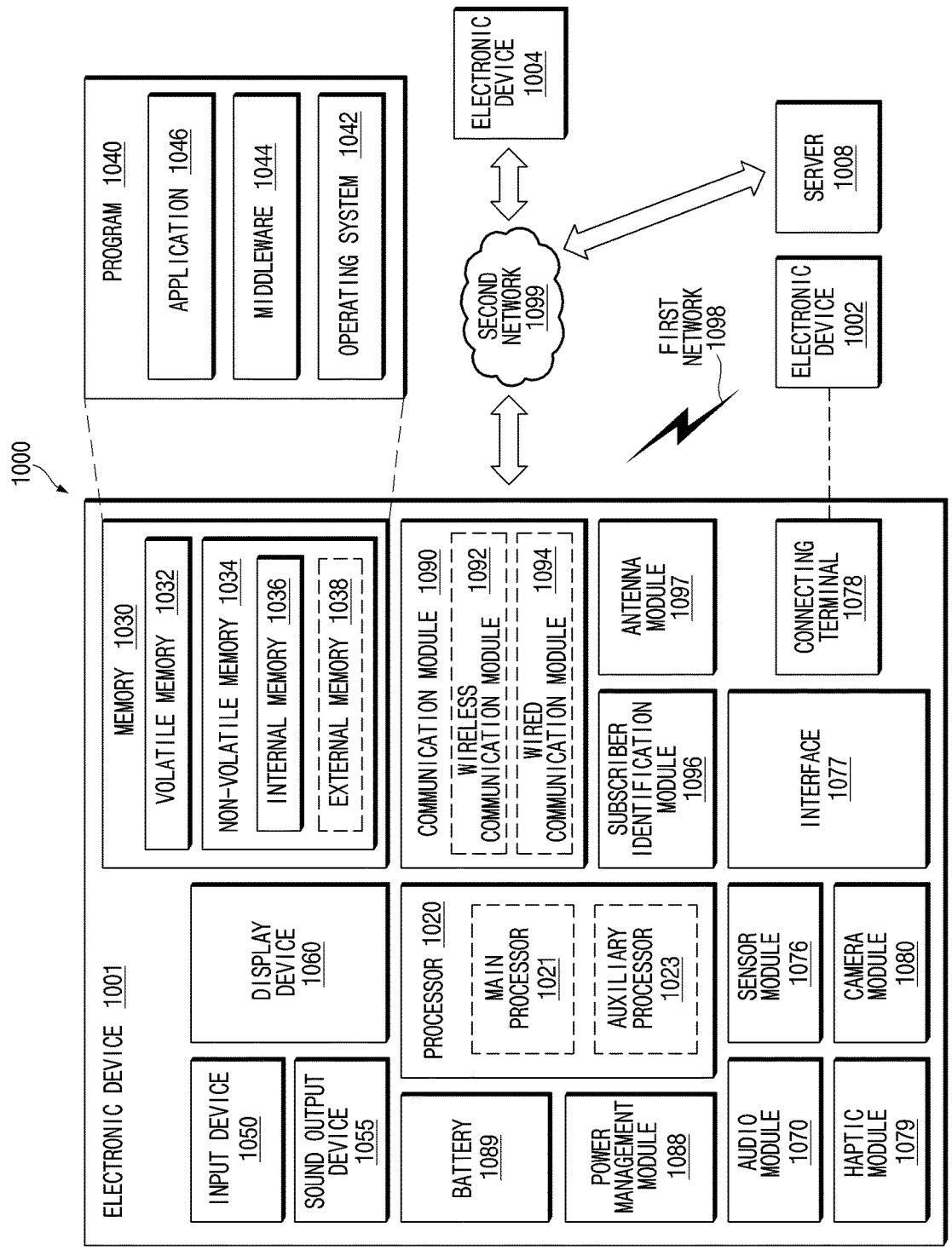
FIG. 1 is a block diagram of an electronic device in a network environment, according to various embodiments.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

An aspect of the disclosure is to provide a driving manner that is capable of improving battery charging efficiency and is associated with stable power supply and discharging.

FIG. 1 is a block diagram illustrating an electronic device 1001 in a network environment 1000 according to various embodiments. Referring to FIG. 1, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034.

According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an ISP or a CP) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, ISP, or flashes.

The power management module 1088 may manage power supplied to the electronic device 1001. According to one embodiment, the power management module 1088 may be implemented as at least part of, for example, a PMIC.

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more CPs that are operable independently from the processor 1020 (e.g., the AP) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth, wireless-fidelity (Wi-Fi) direct, or Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of the operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
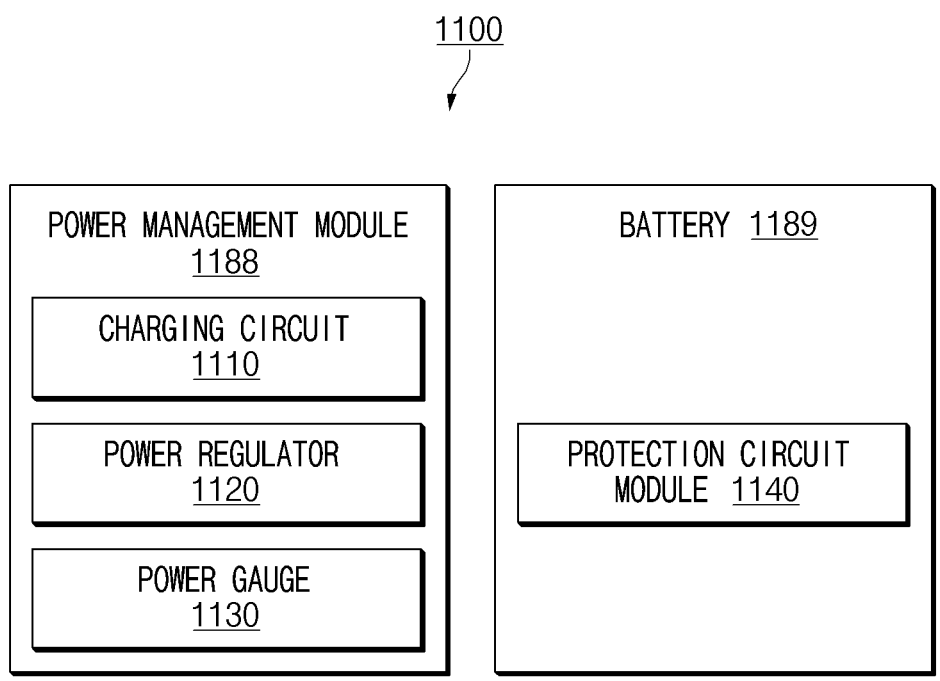
FIG. 2 is a block diagram of a power management module and a battery, according to an embodiment.

FIG. 2 is a block diagram of an electronic device 1100 including a power management module 1188 and a battery 1189, according to an embodiment.

Referring to FIG. 2, the power management module 1188 includes a charging circuit 1110 (e.g., a part of a power supply circuit 130 of FIG. 3, to be described later), a power regulator 1120, or a power gauge 1130 (e.g., a first fuel gauge 136a and/or a second fuel gauge 136b of FIGS. 4A and 4B, to be described later). The charging circuit 1110 may charge the battery 1189 by using power supplied from an external power source for the electronic device 1100. The charging circuit 1110 may select a charging manner (e.g., normal charging or quick charging) based on at least a part of a kind (e.g., a power adapter, a USB or a wireless charging) of an external power source, a magnitude (e.g., approximately 20 Watts or more) of power capable of being supplied from the external power source, or attributes of the battery 1189, and may charge the battery 1189 by using the selected charging manner. For example, the external power source may be wiredly connected through the connecting terminal 1078 or may be wirelessly connected through the antenna module 1097.

The power regulator 1120 may generate a plurality of powers having different voltages or current levels by regulating a voltage level or a current level of the power supplied from an external power source or the battery 1189. The power regulator 1120 may regulate the power of the external power source or the battery 1189 to a voltage or current level suitable for some of the components included in the electronic device 1100. The power regulator 1120 may be implemented in the form of a low drop out (LDO) regulator or a switching regulator. The power gauge 1130 may measure information (e.g., a capacity, a charging/discharging count, a voltage, or a temperature of the battery 1189) about a use state of the battery 1189.

The power management module 1188 may decide charging state information (e.g., a lifetime, an over-voltage, a low voltage, an over-current, overcharging, an over discharge, over-heating, a short circuit, or swelling) associated with charging the battery 1189 based on at least a portion of the use state information, by using the charging circuit 1110, the power regulator 1120, or the power gauge 1130. The power management module 1188 may determine whether the battery 1189 is abnormal or normal, based on at least a portion of the decided charging state information. When it is determined that the battery 1189 is in an abnormal state, the power management module 1188 may control the charging of the battery 1189 (e.g., may decrease a charging current or voltage or may stop the charging). At least some of the functions of the power management module 1188 may be performed by an external control device (e.g., the processor 1020).

The battery 1189 may include a protection circuit module (PCM) 1140. The PCM 1140 may perform one or more functions (e.g., a pre-cutoff function) for the purpose of preventing the reduction of performance of the battery 1189 or damage to the battery 1189. The PCM 1140 may be implemented, additionally or alternatively, as at least a part of a battery management system (BMS) capable of performing various functions including cell balancing, performing battery capacity measurement, performing charging/discharging count measurement, performing temperature measurement, or voltage measurement.

At least a portion of the use state information or the charging state information of the battery 1189 may be measured by using a relevant sensor (e.g., a temperature sensor) in the sensor module 1130, the power gauge 1130, or the power management module 1188. The relevant sensor (e.g., a temperature sensor) in the sensor module 1076 may be included as a part (or member) of the PCM 1140, or may be positioned in the vicinity of the battery 1189 as a device independent of the PCM 1140.

Figure 3:
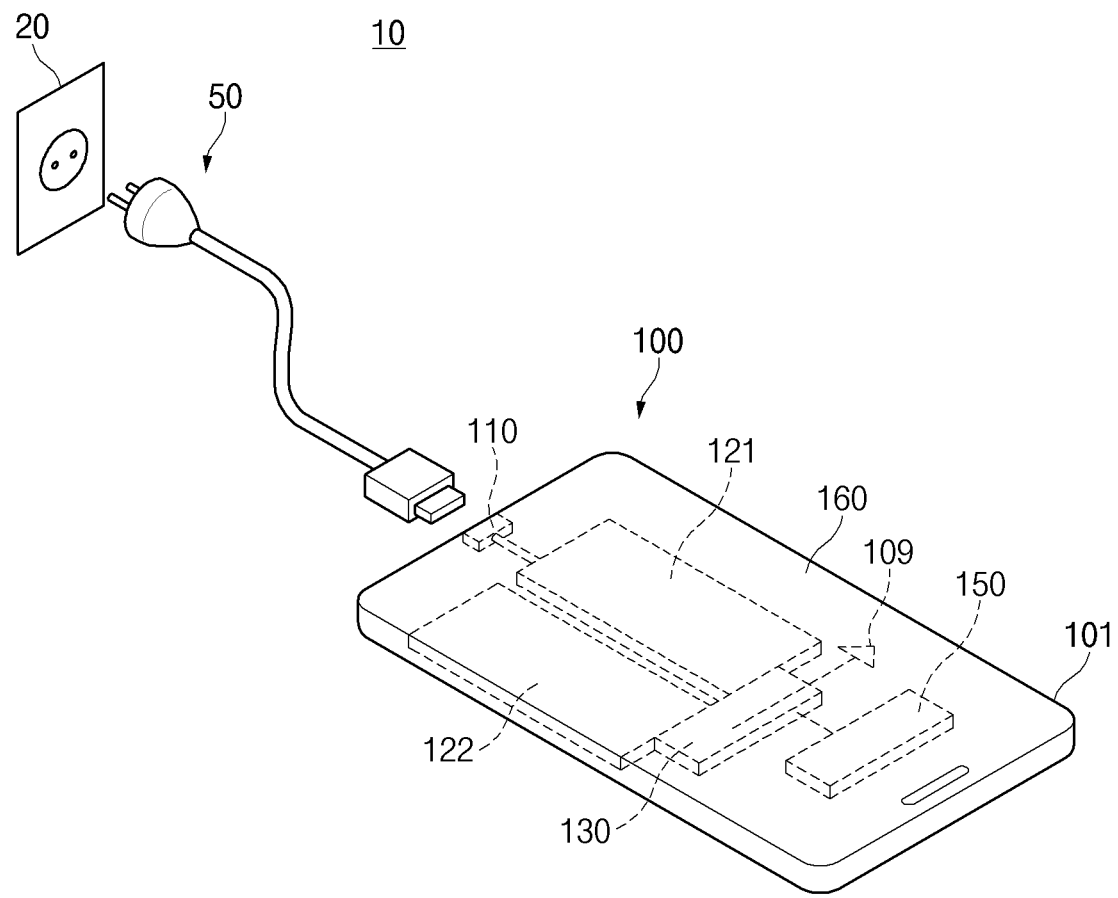
FIG. 3 is a diagram illustrating an example of a charging environment of an electronic device, according to an embodiment.

FIG. 3 is a diagram illustrating an example of a charging environment of an electronic device, according to an embodiment.

Referring to FIG. 3, a charging environment 10 of an electronic device includes a charging adapter 50 and an electronic device 100.

Referring to FIG. 3, in the charging environment 10 where one side of the charging adapter 50 is connected with a permanent power source 20 and an opposite side of the charging environment 10 is connected with the electronic device 100, the charging adapter 50 may transfer power supplied from the permanent power source 20 to the electronic device 100.

The electronic device 100 includes a charging interface 110 (e.g., a connector), a power supply circuit 130 (e.g., the power management module 1188 of FIG. 2), a first battery 121, a second battery 122, and a load 150. The electronic device 100 may further include a ground member 109 that supports a ground of the power supply circuit 130 (or a charging circuit). The ground member 109 may include at least a portion of a metal material included in the electronic device 100. For example, the ground member 109 may include at least a portion of at least one of a ground area of a printed circuit board (PCB) included in the electronic device 100, at least a portion of a housing 101, a metal sheet disposed on a rear surface of a display 160, or a metal structure surrounding the first battery 121 and the second battery 122. The electronic device 100 may further include the housing 101 and the display 160 that is disposed on one surface of the housing 101 and is exposed through the one surface, and the electronic device 100 may drive the display 160 by using power from the first battery 121 and the second battery 122 or by using power transferred through the charging interface 110. The display 160 may output an object associated with a charge level of each of the first battery 121 and the second battery 122, an integrated charge level (an integrated charge level of the first battery 121 and the second battery 122), or a balancing state (whether charge levels of the first battery 121 and the second battery 122 are identical or how much of a difference between charge levels of the first battery 121 and the second battery 122 there is).

The charging interface 110 may be, for example, in the form of a socket into which one side of the charging adapter 50 is capable of being inserted. The charging interface 110 may transfer a power supplied through a cable to the power supply circuit 130. The charging interface 110 may include a USB interface or a micro USB interface. The charging interface 110 may include an element (e.g., an antenna or a coil for wireless charging) associated with wireless charging.

The power supply circuit 130 may be electrically connected with the charging interface 110. The electronic device 100 may further include a signal wire (e.g., a cable, a flexible PCB (FPCB) or a PCB where a signal line is formed) that electrically connects the power supply circuit 130 and the charging interface 110. The power supply circuit 130 may convert a voltage of the power supplied through the charging interface 110 to a given level, and the power supply circuit 130 may charge the first battery 121 and the second battery 122 by using the converted power or may supply the converted power to the load 150.

The power supply circuit 130 may control a charge state and a discharge state of the first battery 121 and the second battery 122 to stably supply a power to the load 150 and to efficiently process charging the first battery 121 and the second battery 122. For example, in the charge state of the first battery 121 and the second battery 122, the power supply circuit 130 may switch a connection relationship of the first battery 121 and the second battery 122 into a series connection to improve charging efficiency. Additionally or alternatively, in the discharge state of the first battery 121 and the second battery 122, the power supply circuit 130 may switch a connection relationship of the first battery 121 and the second battery 122 into a parallel connection to make a discharge supply time more stable. Additionally or alternatively, in the discharge state of the first battery 121 and the second battery 122, the power supply circuit 130 may switch a connection relationship of the first battery 121 and the second battery 122 into a series connection and may make the power supply more stable when the load 150 requires a lot of power. Additionally or alternatively, in the charge state of the first battery 121 and the second battery 122, the power supply circuit 130 may supply a charging power to the first battery 121 and the second battery 122 and may control the supply of the charging power such that charge levels of the first battery 121 and the second battery 122 are similar or identical.

The load 150 may be electrically connected with the power supply circuit 130 and may consume the power stored in the first battery 121 and the second battery 122 or the power supplied through the charging interface 110. The load 150 may include, for example, at least one processor 1020. Additionally or alternatively, the load 150 may include the display 160. Additionally or alternatively, the load 150 may include a component which manages the power supplied through the first battery 121 and the second battery 122, or the charging interface 110 of at least one component included in the electronic device 100. For example, the load 150 may include at least one of a camera module, a communication module, a speaker, a microphone, or at least one sensor.

The first battery 121 and the second battery 122 may include a plurality of batteries disposed on one side of the interior of the electronic device 100. An example is illustrated in FIG. 3, as the first battery 121 and the second battery 122 are disposed adjacent to each other and in parallel with one another. Additionally or alternatively, the first battery 121 and the second battery 122 may be disposed to overlap each other vertically. The first battery 121 and the second battery 122 may be packaged in one packaging film.

The first battery 121 and the second battery 122 may be connected in series or in parallel depending on switches disposed in the power supply circuit 130. The first battery 121 and the second battery 122 may have the same voltage characteristic or current characteristic. The first battery 121 and the second battery 122 may be configured in such a way that maximum rechargeable charge levels of the first battery 121 and the second battery 122 are identical.

The charging adapter 50 is illustrated in consideration of the wired charging in the above description, but the charging adapter 50 may be replaced with a wireless charger in the case of considering a wireless charging environment. In the electronic device 100, the wireless power supplied from the wireless charger may be supplied to the first battery 121 and the second battery 122, or the load 150, through the power supply circuit 130. For example, the wireless charger may include an external electronic device including an antenna for wireless charging.

Figure 4A:
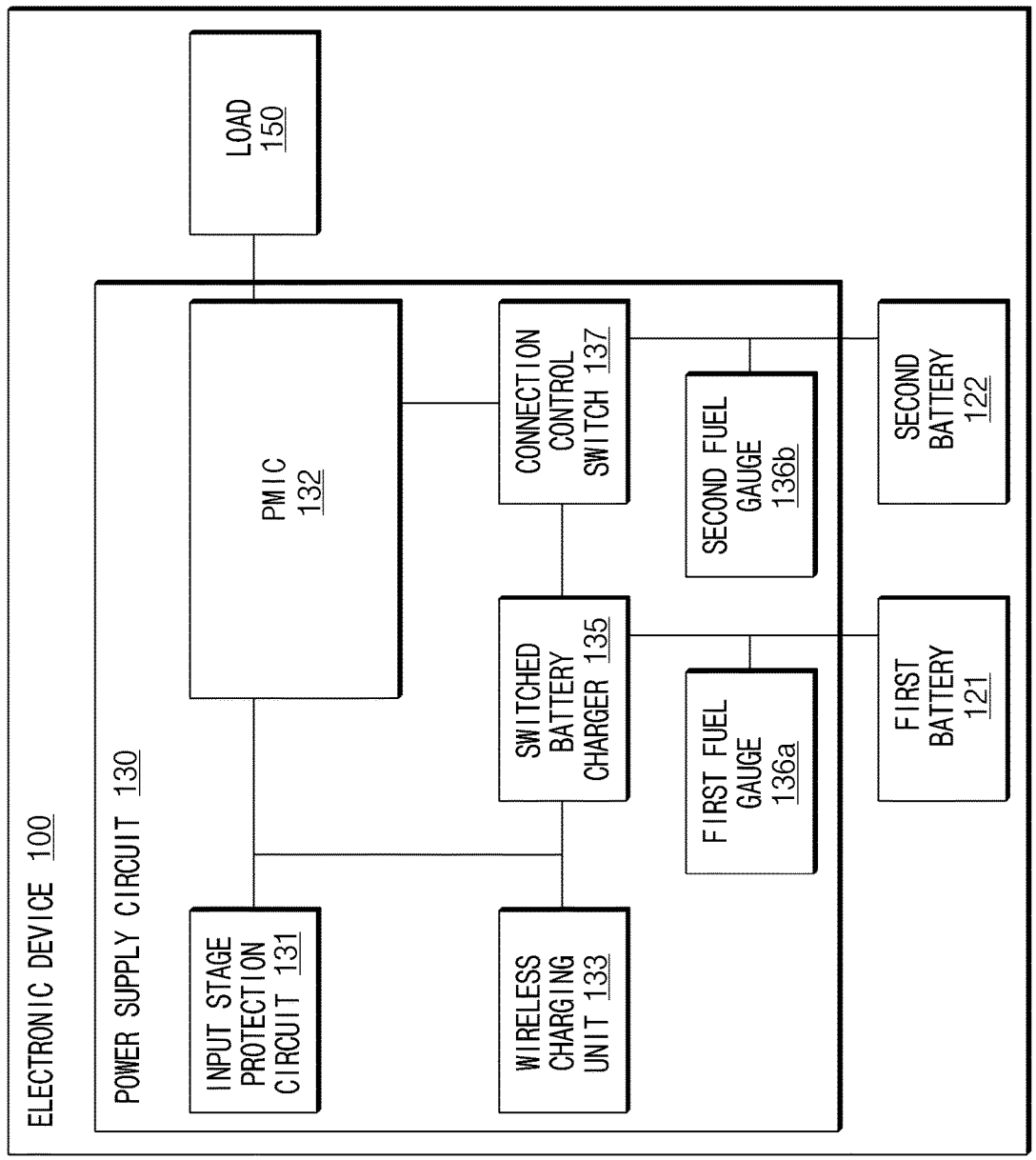
FIG. 4A is a diagram illustrating an example of a partial configuration of an electronic device including a power supply circuit, according to an embodiment.

FIG. 4A is a diagram illustrating an example of a partial configuration of an electronic device including a power supply circuit, according to an embodiment. FIG. 4B is a diagram illustrating an example of a power supply circuit, according to an embodiment.

Figure 4B:
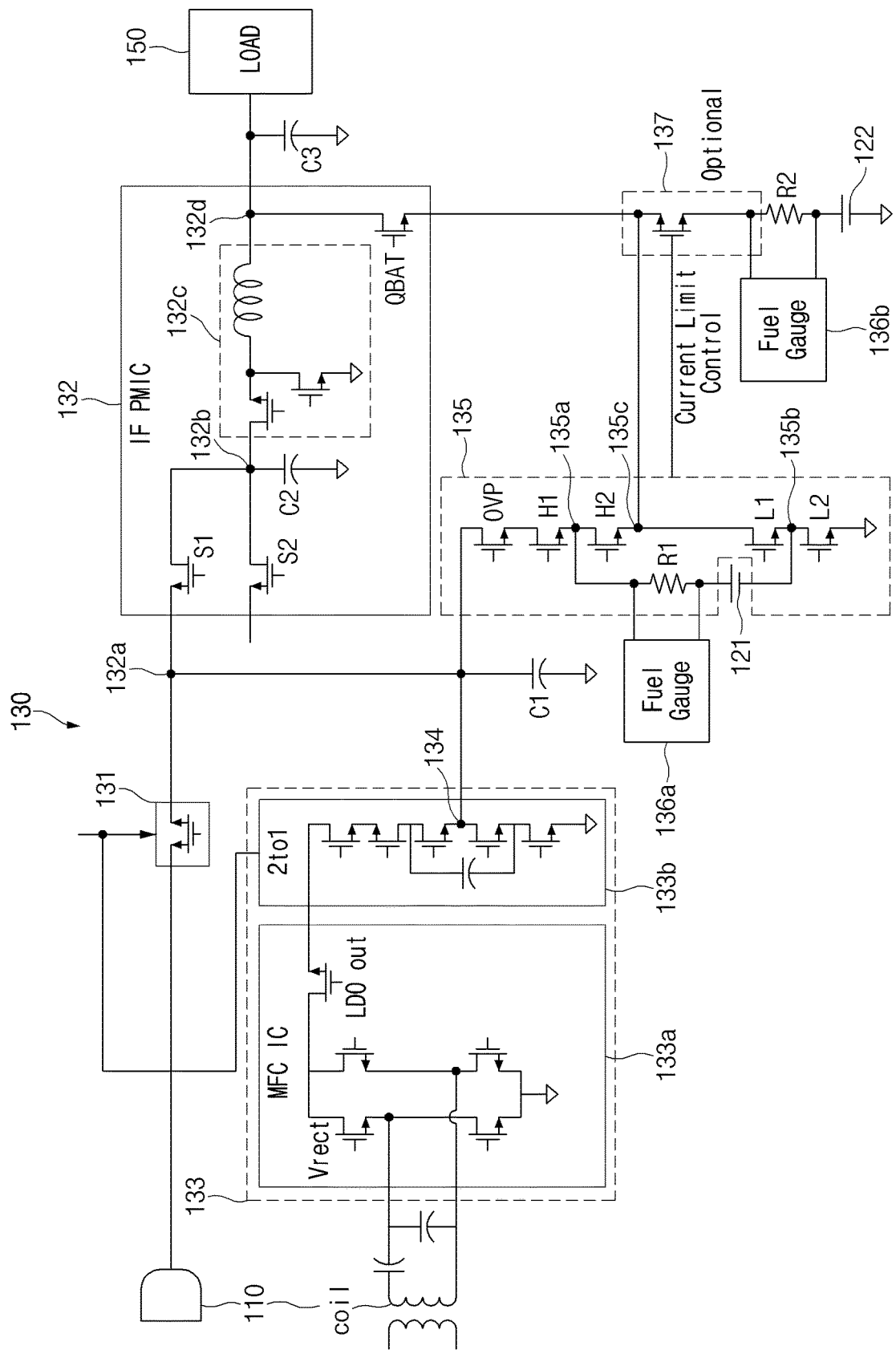
FIG. 4B is a diagram illustrating an example of a power supply circuit, according to an embodiment.

Referring to FIGS. 4A and 4B, the electronic device 100 includes the power supply circuit 130, the load 150, the first battery 121, and the second battery 122. The power supply circuit 130 may include an input stage protection circuit 131, a wireless charging unit 133, a PMIC (a charging control circuit) 132, a switched battery charger 135, a connection control switch 137, a first fuel gauge 136a, and a second fuel gauge 136b.

The electronic device 100 may include the first battery 121 connected with the switched battery charger 135 and the second battery 122 connected with the connection control switch 137. A physical characteristic of the first battery 121 and a physical characteristic of the second battery 122 may be configured to be similar. For example, a rated output of the first battery 121 and a rated output of the second battery 122 may be identical. Additionally or alternatively, a charging/discharging voltage characteristic of the first battery 121 and a charging/discharging voltage characteristic of the second battery 122 may be identical.

The input stage protection circuit 131 may be connected with the charging interface 110 and the wireless charging unit 133 or the PMIC 132. When a power is supplied from the charging adapter 50 through the charging interface 110 with a voltage of a specified level or higher, the input stage protection circuit 131 may block the corresponding overvoltage to protect the power supply circuit 130. Depending on the configuration of the design, the input stage protection circuit 131 may be omitted, or a location of the input stage protection circuit 131 may change.

The wireless charging unit 133 may include a mass flow controller (MFC) circuit 133a and a voltage divider 133b. The MFC circuit 133a may rectify the power transferred through a coil and may transfer the rectified power to the voltage divider 133b. The voltage divider 133b may divide the power transferred through the MFC circuit 133a and may transfer the divided power to the switched battery charger 135 and the PMIC 132 (or IF PMIC). In this regard, an output terminal 134 of the voltage divider 133b may be connected with the PMIC 132 and the switched battery charger 135. A first capacitor C1 having a capacitance of a given magnitude may be connected between the voltage divider 133b and the switched battery charger 135. The first capacitor C1 may stabilize the power that is supplied to the switched battery charger 135.

One side (e.g., an input side) of the PMIC 132 may be connected with the input stage protection circuit 131, the output terminal 134 of the voltage divider 133b, and the switched battery charger 135. The PMIC 132 may include a wired charging input switch S1 connected with the input stage protection circuit 131, and a wireless charging input switch S2 connected with the wireless charging unit 133. The wired charging input switch S1 and the wireless charging input switch S2 may both be connected with an output terminal 132b, and the output terminal 132b may be connected with a buck circuit 132c. A second capacitor C2 may be connected in parallel at the output terminal 132b for power supply stabilization. An output terminal 132d of the buck circuit 132c may be connected with one side of a power supply control switch QBAT. The output terminal 132d may be connected with the load 150, and a third capacitor C3 may be connected between the output terminal 132d and the load 150 for the purpose of stabilizing the power supply to the load 150.

An input terminal of the switched battery charger 135 may be connected with an output terminal 132a of the input stage protection circuit 131 associated with wired charging. The switched battery charger 135 may be connected with an output terminal 134 of the voltage divider 133b of the wireless charging unit 133. The switched battery charger 135 may include first switch H1 and the second switch H2 and third and fourth switches L1 and L2 connected in parallel with the first battery 121, and a battery protection circuit (over voltage protection (OVP)). The first battery 121 and a first gauge resistor R1 may be connected in parallel between the third switch L1 and the fourth switch L2, and the first switch H1 and the second switch H2. The first fuel gauge 136a may be connected in parallel with the first gauge resistor R1. The first gauge resistor R1 may be connected in series with the first battery 121. One side of the battery protection circuit OVP may be connected with the output terminal 134, and an opposite side of the battery protection circuit OVP may be connected with one side of the first switch H1 and the second switch H2. The first switch H1 and the second switch H2 may be cascade-connected, a connection node 135a between the first switch H1 and the second switch H2 may be connected with one side of the first gauge resistor R1.

A source terminal of the battery protection circuit OVP may be connected with the output terminal 134, and a drain terminal of the battery protection circuit OVP may be connected with a source terminal of the first switch H1. A drain terminal of the first switch H1 may be connected with a source terminal of the second switch H2, and a drain terminal of the second switch H2 may be connected with a source terminal of the third switch L1. A drain terminal of the third switch L1 may be connected with a source terminal of the fourth switch L2, and a drain terminal of the fourth switch L2 may be connected with a ground. A connection node 135b between the third switch L1 and the fourth switch L2 may be connected with an opposite side of the first battery 121. An output terminal 135c of the switched battery charger 135 may be connected with one terminal (e.g., a source terminal) of the connection control switch 137.

A gate terminal of the connection control switch 137 may be activated by a current limit control of the switched battery charger 135. A drain terminal of the connection control switch 137 may be connected with a second gauge resistor R2. The second fuel gauge 136b may be connected in parallel with the second gauge resistor R2. One side of the second gauge resistor R2 may be connected with one side of the second battery 122, and an opposite side of the second battery 122 may be connected with the ground.

Figure 5:
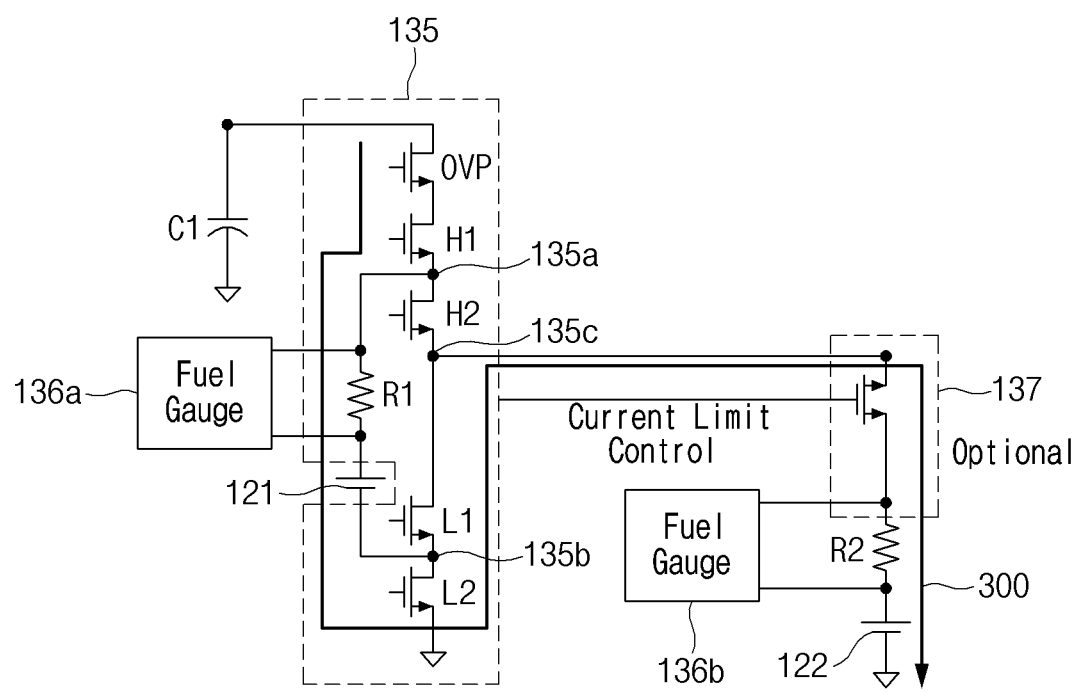
FIG. 5 is a diagram for describing a charging operation of a power supply circuit including batteries, according to an embodiment.

FIG. 5 is a diagram for describing a charging operation of a power supply circuit including batteries, according to an embodiment.

Referring to FIG. 5, when a power is supplied through at least one of the charging adapter 50 or the wireless charging unit 133, a charging path including the battery protection circuit OVP, the first switch H1, the connection node 135a, the first gauge resistor R1, the first battery 121, the connection node 135b, the third switch L1, the output terminal 135c, the connection control switch 137, the second gauge resistor R2, the second battery 122, and the ground may be formed.

In this regard, a PMIC 132 may identify a voltage charged in the first battery 121 by using the first fuel gauge 136a; when the charged voltage is of a specified level or higher (e.g., a voltage suitable to charge the first battery 121 and the second battery 122 in series), the PMIC may control respective switches (e.g., the first switch H1 and the second switch H2, the third switch L1 and the fourth switch L2, and the connection control switch 137) to form the charging path 300. For example, the PMIC 132 may turn on the first switch H1, may turn off the second switch H2, may turn on the third switch L1, and may turn off the fourth switch L2.

When the above charging path 300 is formed, the first battery 121 and the second battery 122 may be connected in series with respect to the path of the charging power (e.g., via the input stage protection circuit 131 of FIG. 2). The first battery 121 and the second battery 122 that are connected in series may be substantially identically charged based on the charging power. For example, when the charging power is 9 volts (V)/2.2 amperes (A), the first battery 121 and the second battery 122 may be charged to 4.4 V/2.2 A at the same time, respectively.

Figure 6:
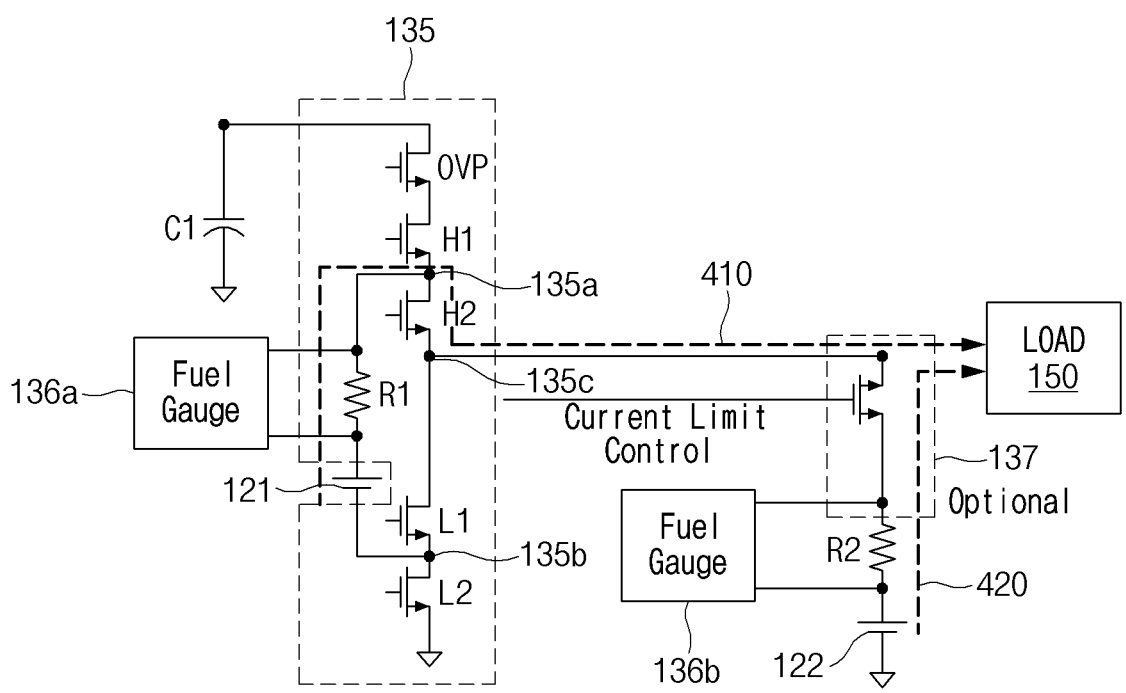
FIG. 6 is a diagram for describing an operation of a power supply circuit including batteries, according to an embodiment.

FIG. 6 is a diagram for describing an operation of a power supply circuit including batteries, according to an embodiment.

Referring to FIG. 6, under control of the PMIC, the fourth switch L2, the second switch H2, and the connection control switch 137 may be configured in a turn-on state. In the case where a charging power is not supplied from the charging interface 110 or in the case where the charging adapter 50 or a wireless charger is separated from the charging interface 110, the PMIC 132 may control the fourth switch L2, the second switch H2, and the connection control switch 137 to be in a turn-on state such that the power of the batteries 121 and 122 is supplied to the load 150.

With regard to discharging a battery (or supplying a power to the load 150), a first discharge path 410 including a ground, the fourth switch L2, the connection node 135b, the first battery 121, the first gauge resistor R1, the connection node 135a, the second switch H2, the output terminal 135c, the connection control switch 137, a second discharge path 420 including the ground, the second battery 122, the second gauge resistor R2, and the connection control switch 137 may be formed under control of the PMIC 132. The first discharge path 410 may be used to transfer the power stored in the first battery 121 to the load 150, and the second discharge path 420 may be used to transfer the power stored in the second battery 122 to the load 150. With regard to cell balancing, a battery may be controlled to be discharged in a state where the first battery 121 is fully charged to 4.4 V/2.2 A and a state where the second battery 122 is fully charged to 4.4 V/2.2 A or has the same voltage as the first battery 121. In this regard, the first fuel gauge 136a may measure a charge level of the first battery 121 while the first battery 121 is discharged and may transfer the measurement result to the PMIC 132. The second fuel gauge 136b may measure a charge level of the second battery 122 while the second battery 122 is discharged and may transfer the measurement result to the PMIC 132. In the case where a voltage difference of one battery (e.g., the first battery 121) and the other battery (e.g., the second battery 122) is a specified value or more, the PMIC 132 may control switch elements (e.g., the first switch H1 and the second switch H2, the third switch L1 and the fourth switch L2, and the connection control switch 137) to supply power from the battery having a relatively high voltage to the load 150. For example, in the case where a voltage of the first battery 121 is higher than a voltage of the second battery 122, with regard to the cell balancing of the first battery 121 and the second battery 122, the PMIC 132 may control the switched battery charger 135 and/or the connection control switch 137 such that the power of the first battery 121 is transferred to the load 150.

The PMIC 132 may form the first discharge path 410 and the second discharge path 420 such that the first battery 121 and the second battery 122 are connected in parallel with the load 150 to supply the charging power.

As described above, the power supply circuit 130 may connect the first battery 121 and the second battery 122 in series with the charging adapter 50 while charging power, and may connect the first battery 121 and the second battery 122 in parallel with the load 150 while supplying power from a battery to the load 150.

Figure 7:
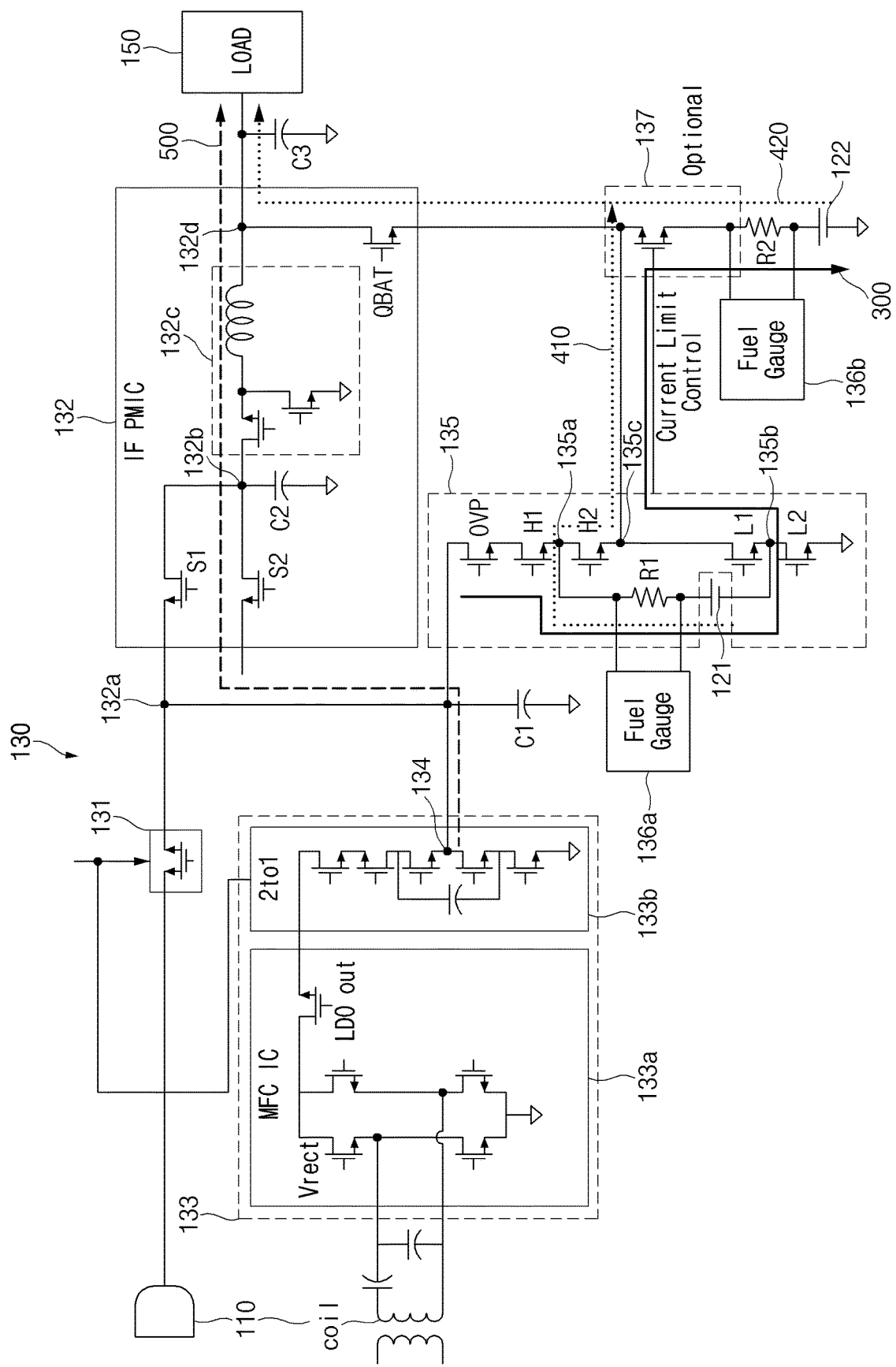
FIG. 7 is a diagram for describing a charging/discharging operation of batteries, according to an embodiment.

FIG. 7 is a diagram for describing a charging/discharging operation of batteries, according to an embodiment.

Referring to FIG. 7, the electronic device 100 including the power supply circuit 130 includes the input stage protection circuit 131, the wireless charging unit 133, the PMIC 132, the switched battery charger 135, the connection control switch 137, the first fuel gauge 136a, and the second fuel gauge 136b. When charging power is supplied from the charging adapter 50 or the wireless charger, the supplied charging power may charge the first battery 121 and the second battery 122. The power supply circuit 130 may form a charging power supply path 500 to transfer a portion of the supplied charging power to the load 150. The charging power supply path 500 may include the wired charging input switch S1, the output terminal 132b, the buck circuit 132c, the output terminal 132d, and the load 150. The third capacitor C3 may be connected in parallel with the output terminal 132d and the load 150 for power supply stabilization. The charging power supply path 500 may be a path formed when the charging adapter 50 is connected; in the case where the wireless charger is connected to supply the charging power, the power supply circuit 130 may form the path 500 including the wireless charging unit 133, the output terminal 134, the wireless charging input switch S2, the output terminal 132b, the buck circuit 132c, the output terminal 132d, and the load 150.

The remaining charging power of the charging power supplied from the charging adapter 50 or the wireless charger other than the charging power supplied to the load 150 through the charging power supply path 500 may be used to charge the first battery 121 and the second battery 122. In this regard, the power supply circuit 130 may form the charging path 300 described above with reference to FIG. 3. While charging the first battery 121 and the second battery 122 (or while forming the charging path 300), the PMIC 132 may maintain the power supply control switch QBAT in a turn-off state. In the case where the charging adapter 50 or the wireless charging unit 133 is separated, the power supply circuit 130 may set the power supply control switch QBAT to a turn-on state, may control switches to form at least one of the first discharge path 410 and the second discharge path 420, and may transfer a power stored in at least one of the first battery 121 and the second battery 122 to the load 150. Based on a power required by the load 150, the PMIC 132 may control the switched battery charger 135, the connection control switch 137, and/or the power supply control switch QBAT. For example, in the case where a portion of the power provided from the charging adapter 50 or the wireless charging unit 133 is capable of bearing the power required by the load 150, the PMIC 132 may maintain the power supply control switch QBAT in a turn-off state and may charge the first battery 121 and the second battery 122 with the remaining charging power other than the charging power supplied to the load 150. Additionally or alternatively, in the case where the power required by the load 150 is greater than a partial charging power transferred through the charging adapter 50, the PMIC 132 may turn on the power supply control switch QBAT, may form the first discharge path 410 and the second discharge path 420, and may allow the power stored in the first battery 121 and the second battery 122 to be supplied to the load 150.

Figure 8:
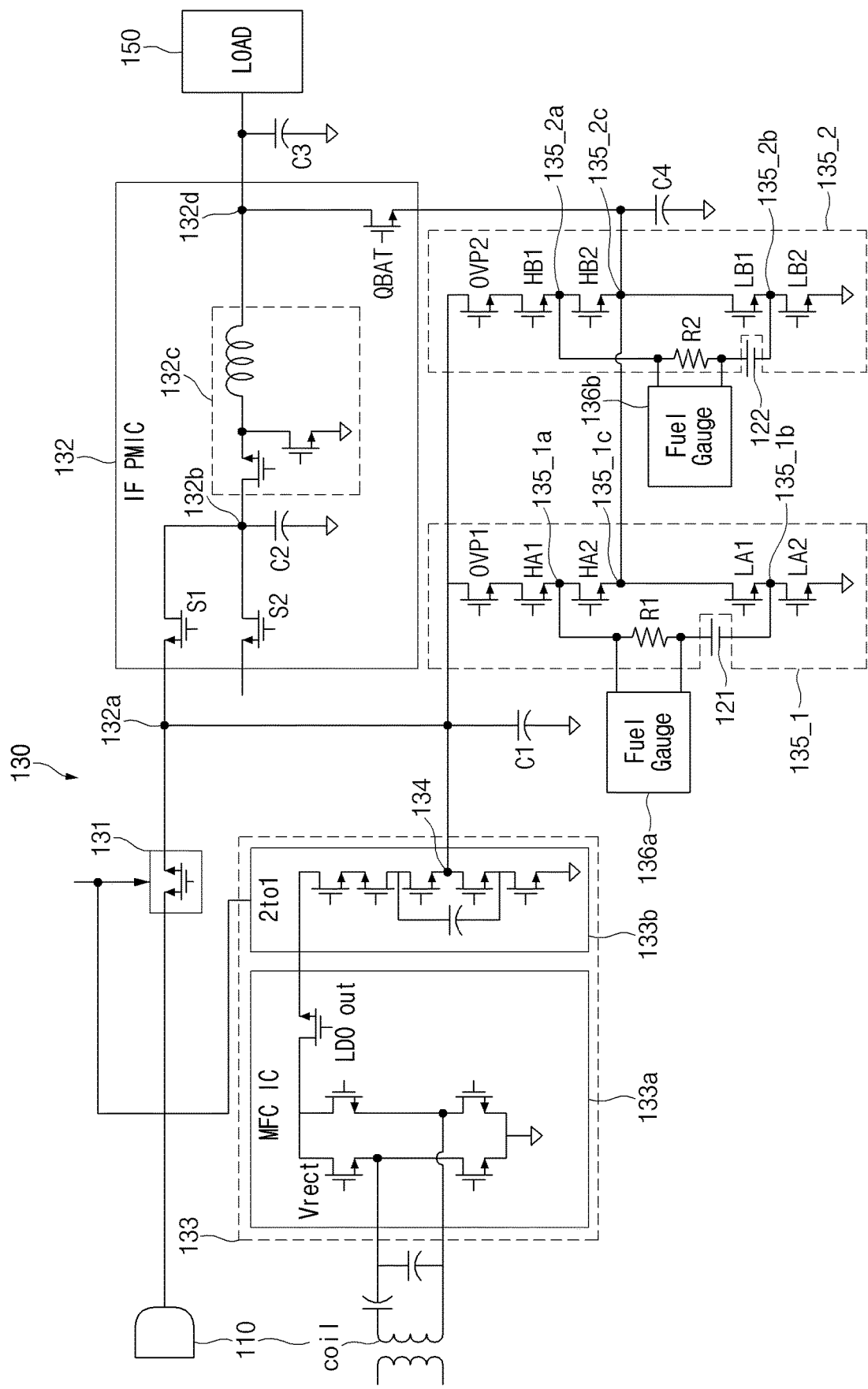
FIG. 8 is a diagram illustrating an example of a partial configuration of an electronic device including a power supply circuit, according to an embodiment.

FIG. 8 is a diagram illustrating an example of a partial configuration of an electronic device including a power supply circuit, according to an embodiment.

Referring to FIG. 8, the power supply circuit 130 includes the input stage protection circuit 131, the wireless charging unit 133, the PMIC 132, a first switched battery charger 135_1, a second switched battery charger 135_2, the first fuel gauge 136a, and the second fuel gauge 136b. The electronic device 100 may include the first battery 121 connected with the first switched battery charger 135_1 and the second battery 122 connected with the second switched battery charger 135_2. A physical characteristic of the first battery 121 and a physical characteristic of the second battery 122 may be configured to be similar. For example, a rated output of the first battery 121 and a rated output of the second battery 122 may be identical. Additionally or alternatively, a charging/discharging voltage characteristic of the first battery 121 and a charging/discharging voltage characteristic of the second battery 122 may be identical.

A configuration of the first switched battery charger 135_1 may be identical or similar to the configuration of the switched battery charger 135 described above with reference to FIGS. 4A, 4B, and 5. For example, an input terminal of the first switched battery charger 135_1 may be connected with the output terminal 134 of the voltage divider 133b of the wireless charging unit 133 or the output terminal 132a of the input stage protection circuit 131. The first switched battery charger 135_1 may include the first switch HA1 and the second switch HA2, and the third switch LA1 and the fourth switch LA2 connected in parallel with the first battery 121 and a first battery protection circuit OVP1. The first gauge resistor R1 and the first battery 121 may be connected in parallel between the first switch HA1 and the second switch HA2, and the third switch LA1 and the fourth switch LA2. The first fuel gauge 136a may be connected in parallel with the first gauge resistor R1. The first gauge resistor R1 and the first battery 121 may be connected in parallel with a connection node 135_1a between the first switch HA1 and the second switch HA2 and a connection node 135_1b between the third switch LA1 and the fourth switch LA2, for example. The first gauge resistor R1 and the first battery 121 may be connected in series. The first switched battery charger 135_1 may include the first switch HA1 and the second switch HA2 cascade connected, and the third switch LA1 and the fourth switch LA2 cascade-connected.

A source terminal of the first battery protection circuit OVP1 may be connected with the output terminal 134 of the voltage divider 133b of the wireless charging unit 133 or the output terminal 132a of the input stage protection circuit 131, and a drain terminal of the first battery protection circuit OVP1 may be connected with a source terminal of the first switch HA1. A drain terminal of the first switch HA1 may be connected with a source terminal of the second switch HA2, and a drain terminal of the second switch HA2 may be connected with a source terminal of the third switch LA1. A drain terminal of the third switch LA1 may be connected with a source terminal of the fourth switch LA2, and a drain terminal of the fourth switch LA2 may be connected with the ground. The connection node 135_1b between the third switch LA1 and the fourth switch LA2 may be connected with an opposite side of the first battery 121. An output terminal 135_1c of the first switched battery charger 135_1 may be connected with one terminal of the second switched battery charger 135_2.

An input terminal of the second switched battery charger 135_2 may be connected with the output terminal 134 of the voltage divider 133b of the wireless charging unit 133 or the output terminal 132a of the input stage protection circuit 131. The second switched battery charger 135_2 may include the fifth switch HB1 and the sixth switch HB2, and the seventh switch LB1 and the eighth switch LB2 connected in parallel with the second battery 122 and a second battery protection circuit OVP2. The second gauge resistor R2 and the second battery 122 may be connected in parallel between the fifth switch HB1 and the sixth switch HB2, and the seventh switch LB1 and the eighth switch LB2, and the second fuel gauge 136b may be connected in parallel with the second gauge resistor R2. The second gauge resistor R2 and the second battery 122 may be connected in parallel with a connection node 135_2a between the fifth switch HB1 and the sixth switch HB2 and a connection node 135_2b between the seventh switch LB1 and the eighth switch LB2. The second gauge resistor R2 and the second battery 122 may be connected in series. The second switched battery charger 1352 may include the fifth switch HB1 and the sixth switch HB2 cascade-connected, and the seventh switch LB1 and the eighth switch LB2 cascade-connected.

A source terminal of the second battery protection circuit OVP2 may be connected with the output terminal 134 or the output terminal 132a of the input stage protection circuit 131, and a drain terminal of the second battery protection circuit OVP2 may be connected with a source terminal of the fifth switch HB1. A drain terminal of the fifth switch HB1 may be connected with a source terminal of the sixth switch HB2, and a drain terminal of the sixth switch HB2 may be connected with a source terminal of the seventh switch LB1. A drain terminal of the seventh switch LB1 may be connected with a source terminal of the eighth switch LB2, and a drain terminal of the eighth switch LB2 may be connected with the ground. The connection node 135_2b between the seventh switch LB1 and the eighth switch LB2 may be connected with an opposite side of the second battery 122. An output terminal 135_2c of the second switched battery charger 135_2 may be connected with the output terminal 135_1c of the first switched battery charger 135_1. The output terminal 135_2c of the second switched battery charger 135_2 may be connected with one terminal of the power supply control switch QBAT of the PMIC 132. A fourth capacitor C4 may be connected in parallel with the output terminal 135_2c for power supply stabilization.

Figure 9:
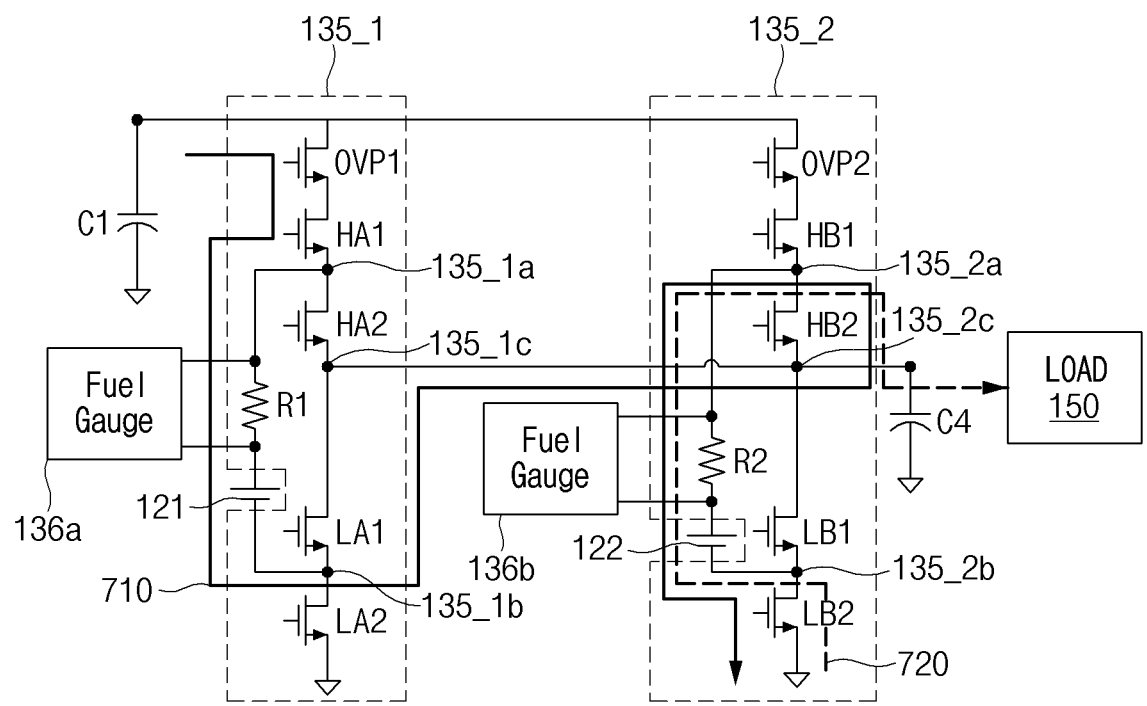
FIG. 9 is a diagram illustrating an example of a partial charging operation and a partial discharging operation of batteries, according to an embodiment.

FIG. 9 is a diagram illustrating an example of a partial charging operation and a partial discharging operation of batteries, according to an embodiment.

Referring to FIG. 9, when a power is supplied through at least one of the charging adapter 50 or the wireless charging unit 133, a charging path 710 including the first battery protection circuit OVP1, the first switch HA1, the connection node 135_1a, the first gauge resistor R1, the first battery 121, the connection node 135_1b, the third switch LA1, the output terminal 135_1c, the output terminal 135_2c, the sixth switch HB2, the connection node 135_2a, the second gauge resistor R2, the second battery 122, the connection node 135_2b, the eighth switch LB2, and the ground may be formed. As the first battery 121 and the second battery 122 may be connected in series, the charging path 710 may be formed.

With regard to forming the charging path 710, the PMIC 132 may turn on the first switch HA1, may turn off the second switch HA2, may turn on the third switch LA1, and may turn off the fourth switch LA2. The PMIC 132 may turn on the sixth switch HB2, may turn off the fifth switch HB1, may turn on the eighth switch LB2, and may turn off the seventh switch LB1. When the above charging path 710 is formed, the first battery 121 and the second battery 122 may be connected in series with respect to the charging power (e.g., the input stage protection circuit 131 of FIG. 2). The first battery 121 and the second battery 122 that are connected in series may be substantially identically charged based on the charging power. For example, when the charging power is 9 V/2.2 A, the first battery 121 and the second battery 122 may be charged to 4.4 V/2.2 A at the same time, respectively.

When the charging power is supplied depending on a switching frequency having a duty ratio of 50%, the charging path 710 may be formed during the first half of one period (i.e., the front half of one period), and the first battery 121 and the second battery 122 may be charged.

When the load 150 requires a battery charging power during a charging duration where the charging path 710 is formed, the charging power stored in the second battery 122 may be supplied to the load 150. For example, in the case where charging power is being supplied to the load 150, the charging power supplied from the charging adapter 50 or the wireless charger may fail to satisfy the amount of power that the load 150 requires, and the charging power stored in the second battery 122 may be supplied to the load 150. In this regard, the PMIC 132 may control switch elements of the second switched battery charger 135_2 such that the charging power stored in the second battery 122 is supplied to the load 150. The PMIC 132 may turn on the eighth switch LB2 and the sixth switch HB2 and may turn off the fifth switch HB1 and the seventh switch LB1. As the switches HB1, HB2, LB1, and LB2 are set to the turn-on and turn-off states described above, a discharge path 720 including the eighth switch LB2, the connection node 135_2b, the second battery 122, the second gauge resistor R2, the connection node 135_2a, the sixth switch HB2, and the output terminal 135_2c may be formed. As the PMIC 132 turns off the third switch LA1 and turns on the fourth switch LA2, the charging of the first battery 121 may be suspended, or the charging of the first battery 121 may be maintained.

Figure 10:
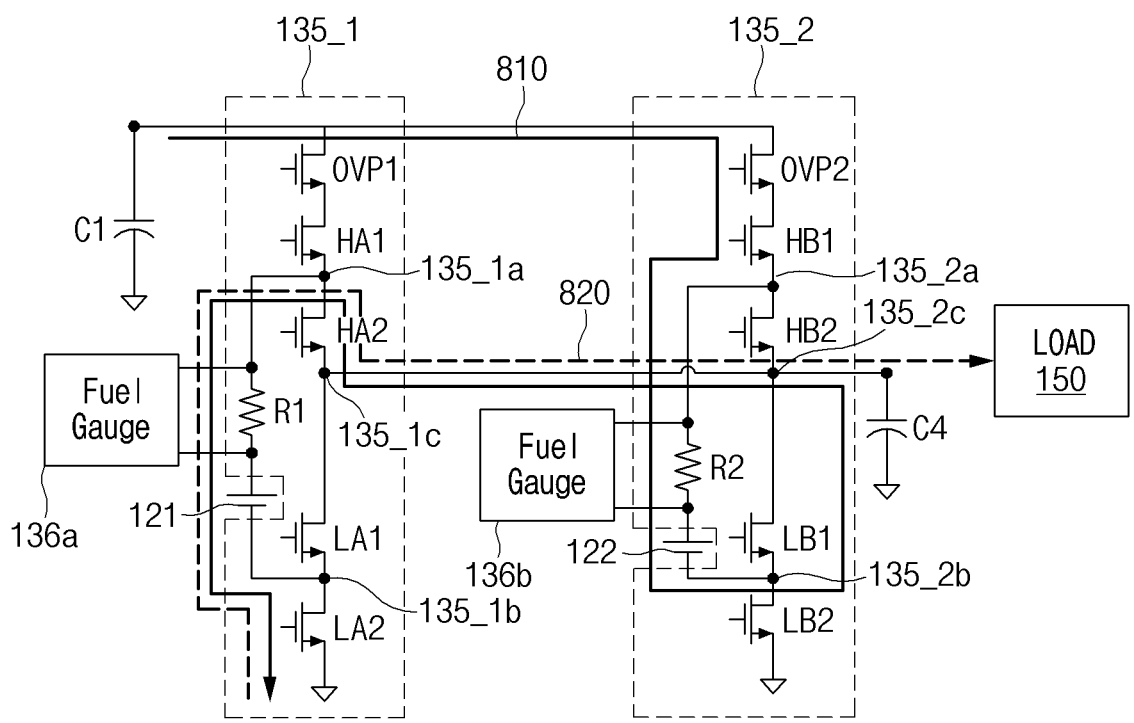
FIG. 10 is a diagram illustrating an example of a partial charging operation and a partial discharging operation of batteries, according to an embodiment.

FIG. 10 is a diagram illustrating an example of a partial charging operation and a partial discharging operation of batteries, according to an embodiment.

Referring to FIG. 10, the PMIC 132 may turn on the fifth switch HB1, the seventh switch LB1, the second switch HA2, and the fourth switch LA2 and may turn off the sixth switch HB2, the eighth switch LB2, the first switch HA1, and the third switch LA1. As the switches HA1, HA2, LA1, LA2, HB1, HB2, LB1, and LB2 are set to the turn-on and turn-off states described above, a charging path 810 including the second battery protection circuit OVP2, the fifth switch HB1, the connection node 135_2a, the second gauge resistor R2, the second battery 122, the connection node 135_2b, the seventh switch LB1, the output terminal 135_2c, the output terminal 135_1c, the second switch HA2, the first gauge resistor R1, the first battery 121, the fourth switch LA2, and the ground may be formed. While the charging path 810 is formed, the second battery 122 and the first battery 121 may be connected in series and may be charged based on the charging power supplied from the charging adapter 50 or the wireless charging unit 133.

When the charging power is supplied depending on a switching frequency (e.g., 120 hertz (Hz) or 60 Hz) having a duty ratio of 50%, the charging path 810 may be formed during the second half of one period (i.e., the rear half of one period), and the first battery 121 and the second battery 122 may be charged.

With reference to FIGS. 9 and 10, when the charging power is supplied based on a switching frequency having a duty ratio of 50%, charging may be performed through the charging path 710 during the first half of one period in a state where the first battery 121 and the second battery 122 are connected in series, and charging may be performed through the charging path 810 during the second half of one period in a state where the second battery 122 and the first battery 121 are connected in series (the order of connecting batteries in the series connection of FIG. 9 being reverse to the order of connecting batteries in the series connection of FIG. 10). In this case, when the charging power is 9 V/2.2 A, the first battery 121 and the second battery 122 may be charged to 4.4 V/2.2 A at the same time, respectively. According to the above charging operation, the balancing between the amount of charging power charged to the first battery 121 and the amount of charging power charged to the second battery 122 may be maintained (i.e., charge amounts of the first battery 121 and the second battery 122 may be identically maintained).

The PMIC 132 may identify the level of charge of the first battery 121 and the level of charge of the second battery 122 through the first fuel gauge 136a and the second fuel gauge 136b, respectively. In the case where the level of charge of the first battery 121 and the level of charge of the second battery 122 are different, the PMIC 132 may change a duty ratio such that charging times of the first battery 121 and the second batter 122 are different. For example, in the case where the level of charge of the first battery 121 is lower than the level of charge of the second battery 122, the PMIC 132 may set a duty ratio (e.g., 60%) at which the battery charging path 710 described with reference to FIG. 9 is formed, to be greater than a duty ratio (e.g., 40%) at which the battery charging path 810 described with reference to FIG. 10 is formed. When the level of charge of the first battery 121 and the level of charge of the second battery 122 are identical, the PMIC 132 may set a duty ratio to be identical (e.g., an on/off duty ratio of 50:50). In the case where the load 150 requires a battery charging power during a charging duration, the charging power stored in the first battery 121 may be supplied to the load 150. For example, in the case where a charging power, which is being supplied to the load 150, of the charging power fails to satisfy the amount of power that the load 150 requires, the charging power stored in the first battery 121 may be supplied to the load 150. In this regard, the PMIC 132 may control switch elements of the first switched battery charger 135_1 such that the charging power stored in the first battery 121 is supplied to the load 150. The PMIC 132 may turn on the fourth switch LA2 and the second switch HA2 and may turn off the sixth switch HB2 and the eighth switch LB2. The power supply circuit 130 may form a discharge path 820 including the ground, the fourth switch LA2, the connection node 135_1b, the first battery 121, the first gauge resistor R1, the connection node 135_1a, the second switch HA2, the output terminal 135_1c, and the output terminal 135_2c. As the PMIC 132 turns off the seventh switch LB1 and turns on the eighth switch LB2, the charging of the second battery 122 may be maintained. Regardless of a charging state or a discharging state, the PMIC 132 may control switches to maintain the cell balancing between the first battery 121 and the second battery 122 (e.g., to identically maintain the level of charge of the first battery 121 and the level of charge of the second battery 122 or to identically maintain a charge amount of the first battery 121 and a charge amount of the second battery 122). Alternatively, the PMIC 132 may control a state of at least one of the first to eighth switches HA1, HA2, LA1, LA2, HB1, HB2, LB1, and LB2 for the purpose of controlling the cell balancing during the charging or discharging of at least one of the first battery 121 and the second batter 122.

The discharge path 720 described with reference to FIG. 9 may be formed during the first half of one cycle, and the charging power stored in the second battery 122 may be supplied to the load 150; the discharge path 820 described with reference to FIG. 10 may be formed during the second half of one cycle, and the charging power stored in the first battery 121 may be supplied to the load 150. According to the discharging operations, as the charging power stored in the first battery 121 and the charging power stored in the second battery 122 are alternately supplied to the load 150 in a state where the cell balancing between the first battery 121 and the second battery 122 is initially maintained, the charging power may be supplied to the load 150 while the level of charge of the first battery 121 and the level of charge of the second battery 122 are balanced. As such, the cell balancing may be maintained when the charging powers of the first battery 121 and the second battery 122 are supplied, and thus, stable power supply may be supported without a charging/discharging operation between the first battery 121 and the second battery 122.

In the case where the charging power supplied from the charging adapter 50 corresponds to a high voltage of a specified magnitude or more (e.g., 9 V or higher) or in a quick charging duration of the first battery 121 and the second battery 122, the PMIC 132 may connect the first battery 121 and the second battery 122 in series (e.g., may connect the first battery 121 and the second battery 122 in series while alternately changing the charging path 710 and the charging path 810, respectively described with reference to FIGS. 9 and 10 for each half one cycle) and may perform charging. In the case where the charging power supplied from the charging adapter 50 corresponds to a voltage of a specified magnitude or less (e.g., 8.8 V or lower) or in a slow charging duration of the first battery 121 and the second battery 122, the PMIC 132 may connect the first battery 121 and the second battery 122 in parallel (e.g., may turn on the first switch HA1, the fifth switch HB1, the fourth switch LA2, and the eighth switch LB2; may turn off the second switch HA2, the sixth switch HB2, the third switch LA1, and the seventh switch LB1; and may turn off the power supply control switch QBAT) and may perform charging.

The PMIC 132 may control characteristics of the first battery protection circuit 135_1 (or the first switched battery charger) and the second battery protection circuit 135_2 (or the second switched battery charger). For example, in the case where a charging characteristic (e.g., a total rechargeable amount) of the first battery 121 and a charging characteristic (e.g., a total rechargeable amount) of the second battery 122 are different, the PMIC 132 may adjust a turn-on cycle of an LDO regulator of the first battery protection circuit 135_1 and a turn-on cycle of an LDO regulator of the second battery protection circuit 135_2, and may compensate for a charging characteristic difference of the first battery 121 and the second battery 122. As such, the PMIC 132 may maintain the balancing between the first battery 121 and the second battery 122.

Under control of a processor, the power supply circuit 130 may supply the charging power from the charging adapter 50 directly to the first battery 121 and the second battery 122 without intervention of the PMIC 132.

Figure 11:
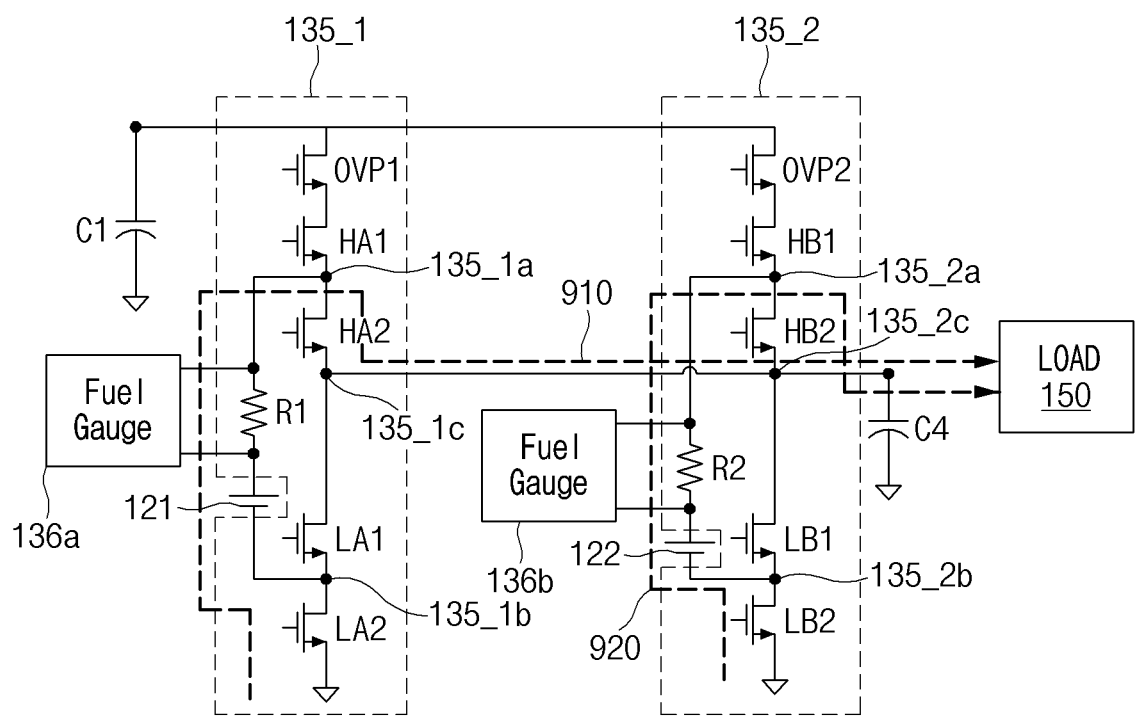
FIG. 11 is a diagram illustrating an example of an operation of batteries, according to an embodiment.

FIG. 11 is a diagram illustrating an example of an operation of batteries, according to an embodiment.

Referring to FIG. 11, the PMIC 132 may turn on the fourth switch LA2 and the second switch HA2 and may turn off the third switch LA1 and the first switch HA1, thus forming a first discharge path 910 including the first battery 121. The first discharge path 910 may include the ground, the fourth switch LA2, the connection node 135_1b, the first battery 121, the first gauge resistor R1, the connection node 135_1a, the second switch HA2, the output terminal 135_1c, and the output terminal 135_2c.

The PMIC 132 may turn on the eighth switch LB2 and the sixth switch HB2 and may turn off the seventh switch LB1 and the fifth switch HB1, thus forming a second discharge path 920 including the second battery 122. When the first discharge path 910 and the second discharge path 920 are formed, the first battery 121 and the second battery 122 may be connected in parallel with respect to the load 150. In the case where the level of charge of the first battery 121 and the level of charge of the second battery 122 are identical, the charging powers of the first battery 121 and the second battery 122 may be supplied to the load 150. In the case where the charging power of each of the first battery 121 and the second battery 122 is 4.4 V/2.2 A, then 4.4 V/2.2 A may be supplied to the load 150.

Under control of the PMIC 132, the first discharge path 910 and the second discharge path 920 may be alternately formed such that the charging power of the first battery 121 is supplied to the load 150 during the first half of one cycle and the charging power of the second battery 122 is supplied to the load 150 during the second half of one cycle.

In the case where the charging adapter 50 or the wireless charging unit 133 is separated and the load 150 requires the amount of power of a specified magnitude or more, the PMIC 132 may form the path for the series connection of the first battery 121 and the second battery 122 described with reference to FIG. 9 or 10 (in this case, a power of the first battery 121 and the second battery 122, connected in series, is transferred to the PMIC 132 through the formed path, which is in reverse to a charging path) and may turn on the power supply control switch QBAT, and thus, the amount of power of a specified magnitude (e.g., 8.8 V/2.2 A) or more may be supplied to the load 150.

Figure 12:
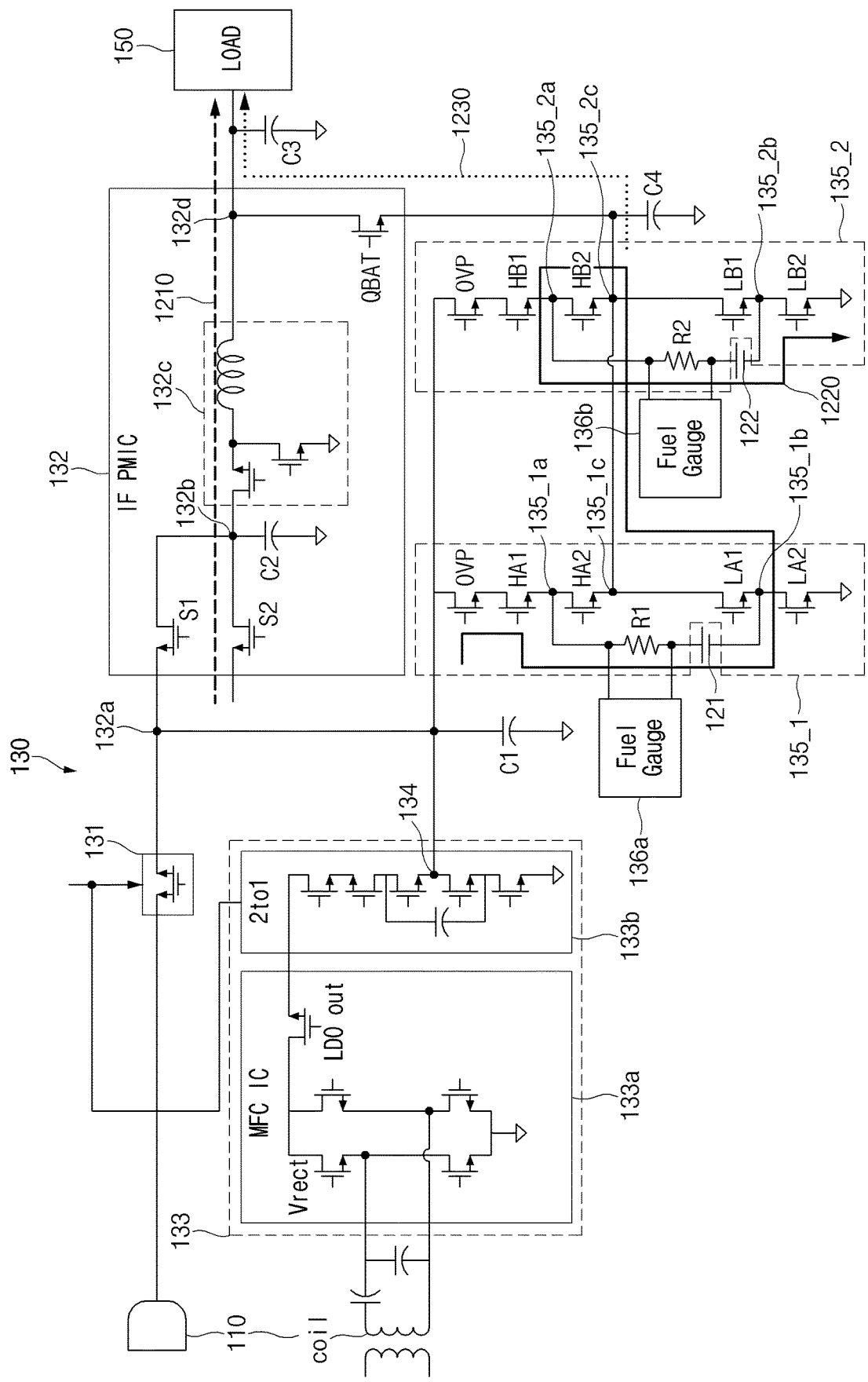
FIG. 12 is a diagram illustrating an example in which an electronic device including a power supply circuit forms a path, according to an embodiment.

FIG. 12 is a diagram illustrating an example in which an electronic device including a power supply circuit forms a path, according to an embodiment.

Referring to FIG. 12, the power supply circuit 130 includes the input stage protection circuit 131, the PMIC 132, the wireless charging unit 133, the first switched battery charger 135_1, the second switched battery charger 135_2, the first fuel gauge 136a, and the second fuel gauge 136b.

When a power is supplied through the charging adapter 50 connected with the charging interface 110 or through the wireless charging unit 133, a portion of the supplied power may be supplied to the load 150 through a first supply path 1210. The first supply path 1210 may include the wired charging input switch S1 (or the wireless charging input switch S2), the output terminal 132b, the buck circuit 132c, and the output terminal 132d.

When a portion of the power supplied through the charging adapter 50 or the wireless charging unit 133 is supplied to the load 150, the remaining portion of the supplied power may be supplied to the first battery 121 and the second battery 122 through a charging path 1220. The charging path 1220 may include the first battery protection circuit OVP1, the first switch HA1, the connection node 135_1a, the first gauge resistor R1, the first battery 121, the connection node 135_1b, the third switch LA1, the output terminal 135_1c, the output terminal 135_2c, the sixth switch HB2, the connection node 135_2a, the second gauge resistor R2, the second battery 122, the connection node 135_2b, the eighth switch LB2, and the ground. The power supplied through the charging path 1220 may charge the first battery 121 and the second battery 122 in a state where the first battery 121 and the second battery 122 are connected in series.

In the case where the power supplied through the charging adapter 50 or the wireless charging unit 133 is blocked, in the case where it is impossible to supply charging power, or in the case where the amount of power required by the load 150 exceeds the amount of power being supplied through the PMIC 132, charging power stored in at least one of the first battery 121 and the second battery 122 may be supplied to the load 150. In this regard, a discharge path 1230 may be formed. The discharge path 1230 may include at least one or more elements connected with at least one of the first battery 121 or the second battery 122. For example, in the case where the charging adapter 50 or the wireless charging unit 133 is separated, the discharge path 1230 may include the first discharge path 910 and the second discharge path 920.

In the discharge path 1230, while the charging adapter 50 is connected and charging power charges the first battery 121 during the first half of one cycle of a switching frequency, the discharge path 720 may be formed as described with reference to FIG. 9, and charging power of the second battery 122 may be supplied to the load 150. In this operation, the PMIC 132 may turn on the power supply control switch QBAT such that the charging power of the second battery 122 is supplied to the load 150. Alternatively, in the discharge path 1230, while the charging adapter 50 is connected and charging power charges the second battery 122 during the second half of one cycle of a switching frequency, the discharge path 820 may be formed as described with reference to FIG. 10, and charging power of the first battery 121 may be supplied to the load 150. In this operation, the PMIC 132 may turn on the power supply control switch QBAT such that the charging power of the first battery 121 is supplied to the load 150.

According to an embodiment, a charging circuit may include a first switched battery charger connected with a first battery, a second switched battery charger connected with a second battery, and a PMIC connected with the first switched battery charger and the second switched battery charger, and the PMIC may control the first switched battery charger and the second switched battery charger to connect the first battery and the second battery in series or in parallel.

The first switched battery charger may include a first switch having one side connected with a node to which charging power is supplied, a second switch connected with an opposite side of the first switch, a third switch having one side connected with an opposite side of the second switch, and a fourth switch having one side connected with an opposite side of the third switch and an opposite side connected with a ground.

The charging circuit may further include a first gauge resistor connected in parallel between a connection point of the first switch and the second switch, and a connection point of the third switch and the fourth switch, and a first fuel gauge, the first fuel gauge and the first gauge resistor may be connected in parallel, and the first battery and the first gauge resistor may be connected in series.

The second switched battery charger may include a fifth switch having one side connected with the node to which the charging power is supplied, a sixth switch connected with an opposite side of the fifth switch, a seventh switch having one side connected with an opposite side of the sixth switch, and an eighth switch having one side connected with an opposite side of the seventh switch and an opposite side of the eighth switch connected with the ground. Additionally, an output terminal between the second switch and the third switch and an output terminal between the sixth switch and the seventh switch may be connected to the second switched battery charger.

The charging circuit may further include a second gauge resistor connected in parallel between a connection point of the fifth switch and the sixth switch and a connection point of the seventh switch and the eighth switch, and a second fuel gauge, the second fuel gauge and the second gauge resistor may be connected in parallel, and the second battery and the second gauge resistor may be connected in series.

During a quick charging time period of the first battery and the second battery, the PMIC may form a charging path in which the first battery and the second battery are connected in series by turning on the first switch, the third switch, the sixth switch, and the eighth switch and turning off the second switch, the fourth switch, the fifth switch, and the seventh switch.

During the quick charging time period of the first battery and the second battery, the PMIC may form a charging path in which the first battery and the second battery are connected in series by turning on the fifth switch, the seventh switch, the second switch, and the fourth switch and turning off the sixth switch, the eighth switch, the first switch, and the third switch.

While discharging charging power stored in the first battery and the second battery, the PMIC may form a first discharge path associated with the first battery by turning on the fourth switch and the second switch and turning off the third switch and the first switch, and may form a second discharge path associated with the second battery by turning on the eighth switch and the sixth switch and turning off the seventh switch and the fifth switch.

During a first half of one cycle of a specified switching frequency, the PMIC may form the first discharge path to supply a charging power of the first battery to a load. During a second half of the cycle of the specified switching frequency, the PMIC may form the second discharge path to supply a charging power of the second battery to the load.

During a first half of one cycle of a specified switching frequency, the PMIC may form a first charging path in which the first battery and the second battery are connected in series by turning on the first switch, the third switch, the sixth switch, and the eighth switch and turning off the second switch, the fourth switch, the fifth switch, and the seventh switch; during a second half of the cycle of the specified switching frequency, the PMIC may form a second charging path in which the first battery and the second battery are connected in series by turning on the fifth switch, the seventh switch, the second switch, and the fourth switch and turning off the sixth switch, the eighth switch, the first switch, and the third switch.

According to an embodiment, an electronic device may include a load, a first battery and a second battery operatively connected with the load, and a charging circuit that controls charging or discharging of the first battery and the second battery. The charging circuit may include a first switched battery charger connected with the first battery, a second switched battery charger connected with the second battery, and a PMIC connected with the first switched battery charger and the second switched battery charger. The PMIC may control the first switched battery charger and the second switched battery charger to connect the first battery and the second battery in series or in parallel.

Figure 13:
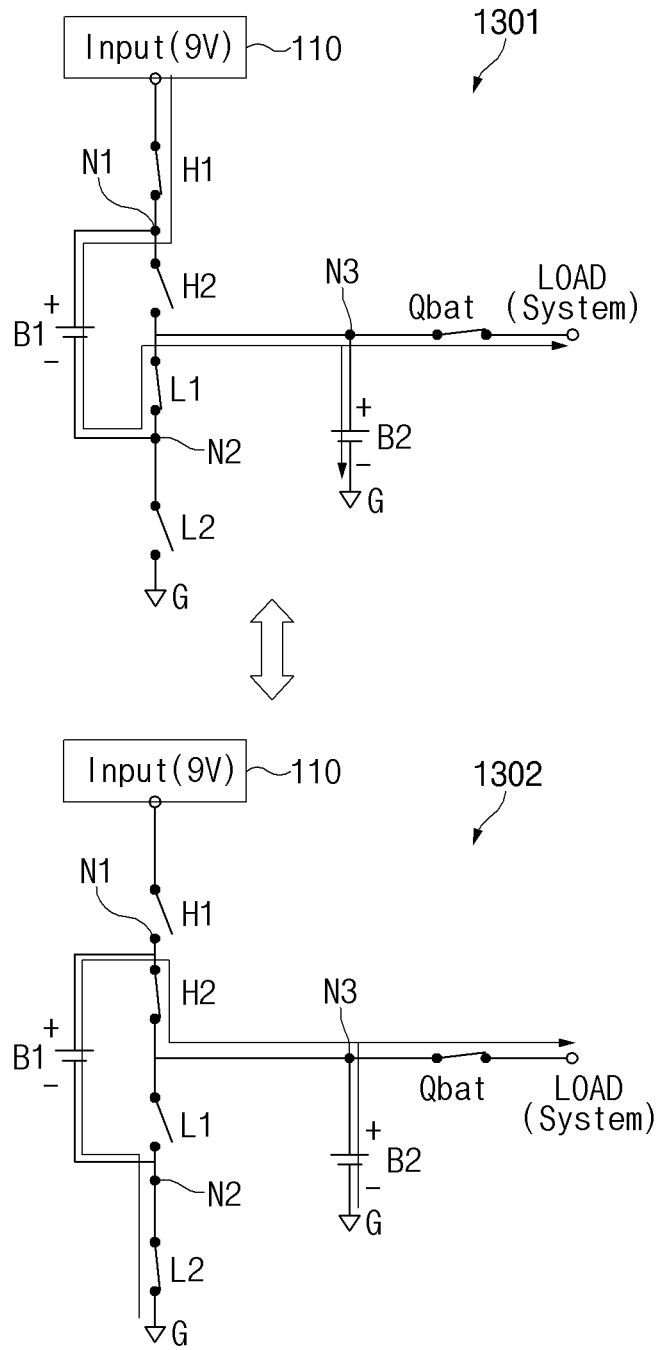
FIG. 13 is a diagram for describing an example of a charging/discharging path of batteries, according to an embodiment.

FIG. 13 is a diagram for describing an example of a charging/discharging path of batteries, according to an embodiment.

Referring to FIGS. 3 and 13, the electronic device 100 includes the housing 101, the display 160 exposed through one surface of the housing 101, at least one ground member "G", a first battery B1 disposed in the housing 101 and including a first anode ((+) of B1) and a first cathode ((−) of B1), a second battery B2 disposed in the housing 101 and including a second anode ((+) of B2) and a second cathode ((−) of B2), which is electrically connected with the ground member "G", a charging circuit electrically connected with the first battery B1 and the second battery B2, a charging interface 110 electrically connected with the charging circuit, and a PMIC 132 electrically connected with the charging interface 110 and the charging circuit. The PMIC may manage a power supplied to the electronic device 100. The ground member "G" may include at least a portion of a metal material included in the electronic device 100.

When an external power source is connected through the charging interface 110, the charging circuit may connect the first battery B1 and the second battery B2 in series during a first time period in a first state 1301, and may connect the first battery B1 and the second battery B2 in parallel during a second time period in a second state 1302.

The charging circuit may include a first node N1 electrically connected with the first anode ((+) of B1), a second node N2 electrically connected with the first cathode ((−) of B1), a third node N3 electrically connected with the second anode ((+) of B2), a first switch H1 electrically connected between the charging interface 110 (e.g., a connector or a USB connector) and the first node N1, a second switch H2 electrically connected between the first node N1 and the third node N3, a third switch L1 electrically connected between the second node N2 and the third node N3, and a fourth switch L2 electrically connected between the second node L2 and the ground member "G".

During the first time period in the state 1301, the charging circuit may turn on the first switch H1 and the third switch L1 and may turn off the second switch H2 and the fourth switch L2; during the second time period in the state 1302, the charging circuit may turn on the second switch H2 and the fourth switch L2 and may turn off the first switch H1 and the third switch L1.

During the first time period in state 1301, the charging circuit may charge at least one of the first battery B1 or the second battery B2. During the second time period in 1302, the charging circuit may discharge at least one of the first battery B1 or the second battery B2.

The electronic device may further include a processor 1020 electrically connected with the charging circuit and the PMIC. The processor 1020 may determine impedances of the first battery B1 and the second battery B2, and determine a system load condition of the electronic device 100. In addition, the processor 1020 may determine the first time period and the second time period based on the determined impedances of the first battery B1 and the second battery B2, and the determined system load condition.

The charging interface 110 may include an interface which is wiredly or wirelessly supplied with a power from the external power source.

Figure 14:
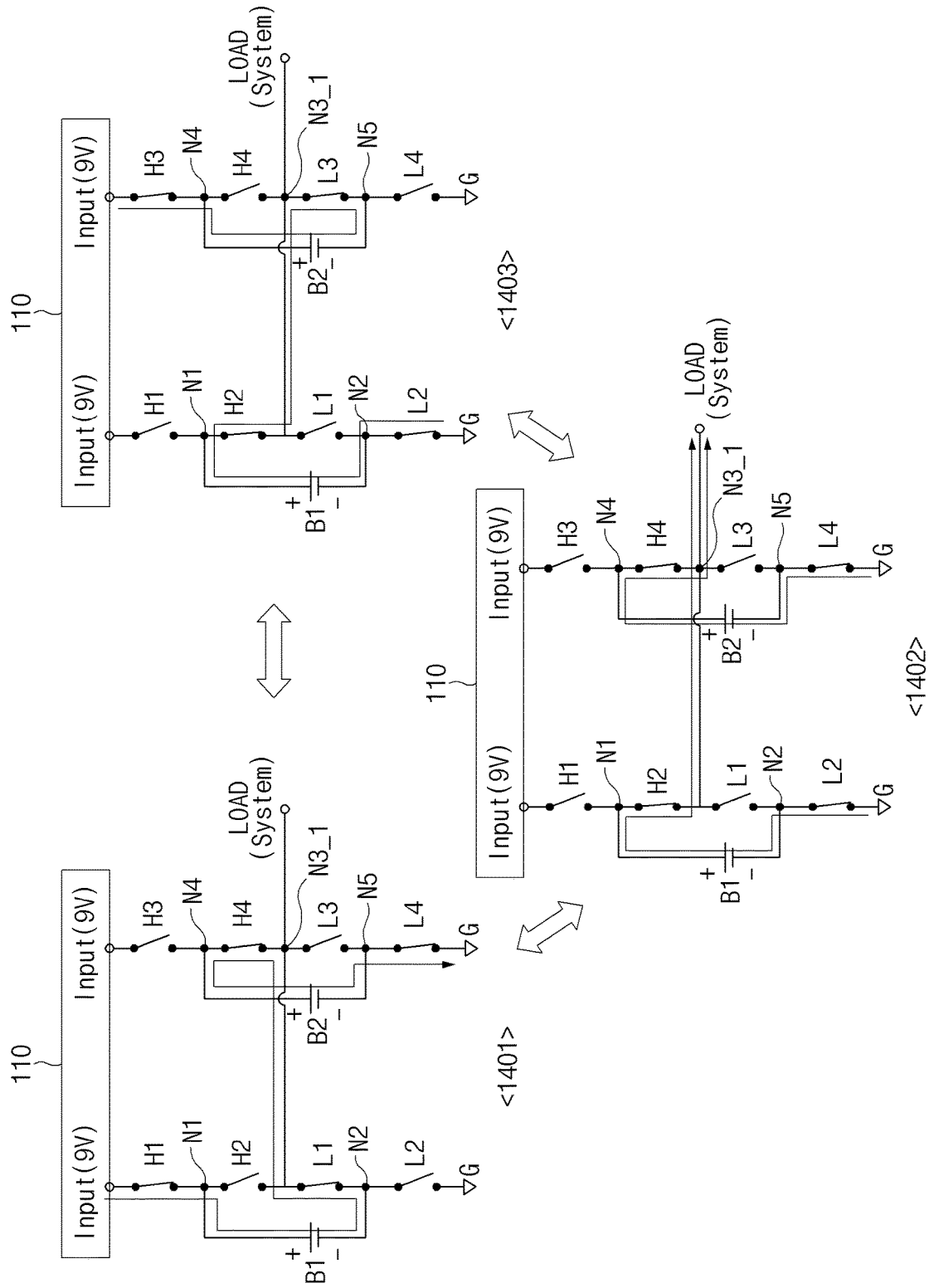
FIG. 14 is a diagram for describing an example of a charging/discharging path of batteries, according to an embodiment.

FIG. 14 is a diagram for describing an example of a charging/discharging path of batteries, according to an embodiment.

Referring to FIGS. 3 and 14, the electronic device 100 includes a housing 101, a display 160 exposed through one surface of the housing 101, at least one ground member "G", a first battery B1 disposed in the housing 101 and including a first anode ((+) of B1) and a first cathode ((−) of B1), a second battery B2 disposed in the housing 101 and including a second anode ((+) of B2) and a second cathode ((−) of B2), a charging circuit electrically connected with the first battery B1 and the second battery B2, the charging interface 110 electrically connected with the charging circuit, and a PMIC 132 electrically connected with the charging interface 110 and the charging circuit. The PMIC 132 may manage a power supplied to the electronic device 100.

When an external power source is connected through the charging interface 110, the charging circuit may electrically connect the first cathode ((−) of B1) and the second anode ((+) of B2), during a first time period in state 1401, such that the first battery B1 and the second battery B2 are connected in series; may connect the first battery B1 and the second battery B2 in parallel during a second time period in state 1402; and may electrically connect the first anode ((+) of B1) and the second cathode ((−) of B2), during a third time period in state 1403, such that the second battery B2 and the first battery B1 are connected in series.

The charging circuit may include a first node N1 (e.g., the connection node 135_1a) electrically connected with the first anode ((+) of B1), second node N2 (e.g., the connection node 135_1b) electrically connected with the first cathode ((−) of B1), a third node N3 electrically connected with the PMIC, a fourth node N4 electrically connected with the second anode ((+) of B2), a fifth node N5 electrically connected with the second cathode ((−) of B2), a first switch H1 electrically connected between the charging interface 110 and the first node N1, a second switch H2 electrically connected between the first node N1 and the third node N3, a third switch L1 electrically connected between the second node N2 and the third node N3, a fourth switch L2 electrically connected between the second node N2 and the ground member "G", a fifth switch H3 electrically connected between the charging interface 110 and the fourth node N4, a sixth switch H4 electrically connected between the third node N3 and the fourth node N4, a seventh switch L3 electrically connected between the third node N3 and the fifth node N5, and an eighth switch L4 electrically connected between the fifth node N5 and the ground member "G".

During the first time period in state 1401, the charging circuit may turn on the first switch H1, the third switch L1, the sixth switch H4, and the eighth switch L4, and may turn off the second switch H2, the fourth switch L2, the fifth switch H3, and the seventh switch L3. During the second time period in state 1402, the charging circuit may turn on the second switch H2, the fourth switch L2, the sixth switch H4, and the eighth switch L4, and may turn off the first switch H1, the third switch L1, the fifth switch H3, and the seventh switch L3. During the third time period in state 1403, the charging circuit may turn on the second switch H2, the fourth switch L2, the fifth switch H3, and the seventh switch L3, and may turn off the first switch H1, the third switch L1, the sixth switch H4, and the eighth switch L4.

The charging circuit may charge the first battery B1 and the second battery B2 during the first time period and the third time period in state 1403, and may discharge the first battery B1 and the second battery B2 during the second time period in state 1402.

The electronic device may further include a processor 1020 electrically connected with the charging circuit and the power management module. The processor 1020 may determine impedances of the first battery B1 and the second battery B2, and determine a system load condition of the electronic device. In addition, the processor 1020 may determine the first time period, the second time period, and the third time period, based on the first battery B1 and the second battery B2, and the determined system load condition.

According to various embodiments of the disclosure, an electronic device may improve a battery charging speed by make it higher while maintaining balancing between batteries. Additionally, the electronic device may smoothly and stably supply power required by the electronic device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
    a housing:
    a display exposed through at least one surface of the housing;
    at least one ground member;
    a first battery disposed in the housing and including a first anode and a first cathode;
    a second battery disposed in the housing and including a second anode and a second cathode, which is electrically connected with the at least one ground member;
    a charging circuit electrically connected with the first battery and the second battery;
    a charging interface electrically connected with the charging circuit;
    a power management integrated circuit (PMIC) electrically connected with the charging interface and the charging circuit, and configured to manage power supplied to the electronic device,
    wherein, when an external power source is connected through the charging interface, the charging circuit is configured to connect the first battery and the second battery in series during a first time period and to connect the first battery and the second battery in parallel during a second time period, and
    a processor electrically connected with the charging circuit and the PMIC, wherein the processor is configured to:
        determine impedances of the first battery and the second battery and a system load condition of the electronic device; and
        determine the first time period and the second time period, based on the impedances of the first battery and the second battery and the system load condition of the electronic device.

2. The electronic device of claim 1, wherein the charging circuit includes:
    a first node electrically connected with the first anode;
    a second node electrically connected with the first cathode;
    a third node electrically connected with the second anode;
    a first switch electrically connected between the charging interface and the first node;
    a second switch electrically connected between the first node and the third node;
    a third switch electrically connected between the second node and the third node; and
    a fourth switch electrically connected between the second node and the at least one ground member.

3. The electronic device of claim 2, wherein, during the first time period, the charging circuit is configured to:
    turn on the first switch and the third switch, and
    turn off the second switch and the fourth switch, and
    wherein, during the second time period, the charging circuit is configured to:
    turn on the second switch and the fourth switch, and
    turn off the first switch and the third switch.

4. The electronic device of claim 1, wherein, during the first time period, the charging circuit is configured to charge at least one of the first battery or the second battery, and
    wherein, during the second time period, the charging circuit is configured to discharge at least one of the first battery or the second battery.

5. The electronic device of claim 1, wherein the charging interface is configured to include an interface which is wiredly or wirelessly supplied with power from the external power source.

6. An electronic device comprising:
    a housing:
    a display exposed through one surface of the housing;
    at least one ground member;
    a first battery disposed in the housing and including a first anode and a first cathode;
    a second battery disposed in the housing and including a second anode and a second cathode;
    a charging circuit electrically connected with the first battery and the second battery;
    a charging interface electrically connected with the charging circuit;
    a power management integrated circuit (PMIC) electrically connected with the charging interface and the charging circuit, and configured to manage power supplied to the electronic device,
    wherein, when an external power source is connected through the charging interface, the charging circuit is configured to:
        electrically connect the first cathode and the second anode, during a first time period, such that the first battery and the second battery are connected in series;
        connect the first battery and the second battery in parallel during a second time period; and
        electrically connect the first anode and the second cathode, during a third time period, such that the second battery and the first battery are connected in series; and a processor electrically connected with the charging circuit and the PMIC, and wherein the processor is configured to:
 determine impedances of the first battery and the second battery and a system load condition of the electronic device; and
 determine the first time period, the second time period, and the third time period, based on the impedances of the first battery and the second battery and the system load condition of the electronic device.

7. The electronic device of claim 6, wherein the charging circuit includes:
 a first node electrically connected with the first anode;
 a second node electrically connected with the first cathode;
 a third node electrically connected with the PMIC;
 a fourth node electrically connected with the second anode;
 a fifth node electrically connected with the second cathode;
 a first switch electrically connected between the charging interface and the first node;
 a second switch electrically connected between the first node and the third node;
 a third switch electrically connected between the second node and the third node;
 a fourth switch electrically connected between the second node and the at least one ground member;
 a fifth switch electrically connected between the charging interface and the fourth node;
 a sixth switch electrically connected between the third node and the fourth node;
 a seventh switch electrically connected between the third node and the fifth node; and
 an eighth switch electrically connected between the fifth node and the at least one ground member.

8. The electronic device of claim 7, wherein, during the first time period, the charging circuit is configured to:
 turn on the first switch, the third switch, the sixth switch, and the eighth switch, and
 turn off the second switch, the fourth switch, the fifth switch, and the seventh switch,
 wherein, during the second time period, the charging circuit is configured to:
 turn on the second switch, the fourth switch, the sixth switch, and the eighth switch, and
 turn off the first switch, the third switch, the fifth switch, and the seventh switch, and
 wherein, during the third time period, the charging circuit is configured to:
 turn on the second switch, the fourth switch, the fifth switch, and the seventh switch, and
 turn off the first switch, the third switch, the sixth switch, and the eighth switch.

9. The electronic device of claim 6, wherein the charging circuit is configured to:
 charge the first battery and the second battery during the first time period and the third time period; and
 discharge the first battery and the second battery during the second time period.

10. An electronic device comprising:
 a load;
 a first battery and a second battery operatively connected with the load; and
 a charging circuit configured to control charging or discharging of the first battery and the second battery,
 wherein the charging circuit includes:
  a first switched battery charger connected with the first battery;
  a second switched battery charger connected with the second battery;
  a power management integrated circuit (PMIC) connected with the first switched battery charger and the second switched battery charger;
  a first switch having one side connected with a node to which a charging power is supplied;
  a second switch connected with an opposite side of the first switch;
  a third switch having one side connected with an opposite side of the second switch; and
  a fourth switch having one side connected with an opposite side of the third switch and an opposite side of a node that is connected with a ground, and
  wherein the PMIC controls the first switched battery charger and the second switched battery charger to connect the first battery and the second battery in series or in parallel.

11. The electronic device of claim 10, wherein the first switched battery charger further includes:
 a first gauge resistor connected in parallel between a connection point of the first switch and the second switch and a connection point of the third switch and the fourth switch; and
 a first fuel gauge,
 wherein the first fuel gauge and the first gauge resistor are connected in parallel, and
 wherein the first battery and the first gauge resistor are connected in series.

12. The electronic device of claim 11, wherein, during discharging a charging power stored in the first battery and a charging power stored in the second battery, the PMIC forms a first discharge path associated with the first battery by turning on the fourth switch and the second switch and turning off the third switch and the first switch and forms a second discharge path associated with the second battery by turning on the eighth switch and the sixth switch and turning off the seventh switch and the fifth switch.

13. The electronic device of claim 12, wherein, during a first half of one cycle of a specified switching frequency, the PMIC forms the first discharge path to supply the charging power of the first battery to the load, and
 wherein, during a second half of the cycle of the specified switching frequency, the PMIC forms the second discharge path to supply the charging power of the second battery to the load.

14. The electronic device of claim 11, wherein, during a first half of one cycle of a specified switching frequency, the PMIC forms a first charging path in which the first battery and the second battery are connected in series by turning on the first switch, the third switch, the sixth switch, and the eighth switch and turning off the second switch, the fourth switch, the fifth switch, and the seventh switch, and
 wherein, during a second half of the cycle of the specified switching frequency, the PMIC forms a second charging path in which the first battery and the second battery are connected in series by turning on the fifth switch, the seventh switch, the second switch, and the fourth switch and turning off the sixth switch, the eighth switch, the first switch, and the third switch.

15. The electronic device of claim 10, wherein the second switched battery charger includes:
 a fifth switch having one side connected with the node to which the charging power is supplied;

a sixth switch connected with an opposite side of the fifth switch;

a seventh switch having one side connected with an opposite side of the sixth switch; and an eighth switch having one side connected with an opposite side of the seventh switch and the opposite side of the node that is connected with the ground, wherein an output terminal between the second switch and the third switch and an output terminal between the sixth switch and the seventh switch are connected.

16. The electronic device of claim 15, wherein the second switched battery charger further includes:

a second gauge resistor connected in parallel between a connection point of the fifth switch and the sixth switch and a connection point of the seventh switch and the eighth switch; and a second fuel gauge, wherein the second fuel gauge and the second gauge resistor are connected in parallel, and wherein the second battery and the second gauge resistor are connected in series.

17. The electronic device of claim 15, wherein, during a quick charging time period of the first battery and the second battery, the PMIC forms a charging path in which the first battery and the second battery are connected in series by turning on the first switch, the third switch, the sixth switch, and the eighth switch and turning off the second switch, the fourth switch, the fifth switch, and the seventh switch, or wherein, during the quick charging time period of the first battery and the second battery, the PMIC forms a charging path in which the first battery and the second battery are connected in series by turning on the fifth switch, the seventh switch, the second switch, and the fourth switch and turning off the sixth switch, the eighth switch, the first switch, and the third switch.

* * * * *